United States Patent [19]

Arczynski et al.

[11] Patent Number: 5,483,239

[45] Date of Patent: Jan. 9, 1996

[54] DIRECT MEMORY ACCESS (DMA) SAMPLER

[75] Inventors: Wayne S. Arczynski, Lutherville; Stuart P. Broadwater, White Hall, both of Md.; Larry D. Aschliman, Jacobus, Pa.

[73] Assignee: Westinghouse Electric Corp, Baltimore, Md.

[21] Appl. No.: 887,261

[22] Filed: May 22, 1992

[51] Int. Cl.⁶ .................... G06F 13/10; G06F 13/22
[52] U.S. Cl. .................... 341/141; 364/DIG. 1; 364/920; 364/926; 364/939.4; 341/123
[58] Field of Search ................... 395/400, 425; 364/724.1; 341/123, 141

[56] References Cited

U.S. PATENT DOCUMENTS

| | | | |
|---|---|---|---|
| 4,589,020 | 5/1986 | Akatsuka | 358/160 |
| 4,742,458 | 5/1988 | Nathans et al. | 364/417 |
| 4,794,460 | 12/1988 | Shiota | 358/244 |
| 4,817,176 | 3/1989 | Marshall et al. | 382/43 |
| 4,891,713 | 1/1990 | Mizukoshi et al. | 358/445 |
| 4,994,914 | 2/1991 | Wiseman et al. | 358/160 |
| 5,127,404 | 7/1992 | Wyborny et al. | 128/419 |
| 5,257,025 | 10/1993 | LeCroy, Jr. | 341/150 |
| 5,293,167 | 3/1994 | Campbell, Jr. et al. | 341/141 |

*Primary Examiner*—Eddie P. Chan
*Assistant Examiner*—Hiep T. Nguyen
*Attorney, Agent, or Firm*—C. O. Edwards

[57] ABSTRACT

A microprocessor-based system includes a central processing unit (CPU) and a CPU memory coupled by a CPU bus. A DMA sampler is coupled to the CPU, the CPU memory and the CPU bus. The DMA sampler includes sampling circuitry which is implemented as a finite state machine to maintain a substantially exact sampling rate on at least one analog input signal provided to the DMA sampler. The DMA sampler also includes DMA circuitry implemented as a data flow machine, which requests bus mastership from the CPU when samples obtained by the DMA sampler are available for transfer to the CPU memory. In response to the request, the CPU relinquishes bus mastership to the DMA sampler which provides the sample to the CPU memory and returns bus mastership to the CPU.

19 Claims, 15 Drawing Sheets

DIRECT MEMORY ACCESS (DMA) SAMPLER

BACKGROUND OF THE INVENTION

1. Field of the Invention

This invention is directed to a device and method for sampling an analog input signal(s) to generate a sample, and for providing the sample to a memory in a direct memory access (DMA) operation.

2. Description of the Related Art

DMA sampling systems generally function to sample an analog input signal from a sensor to generate samples which are provided to a memory in a DMA operation. Such systems periodically request bus mastership from a central processing unit (CPU) which is coupled to a memory by a bus. Upon a grant of bus mastership by the CPU, these DMA sampling systems sample the analog input signal to generate a sample which is provided to the memory via the bus under control of the DMA sampling systems. Thereafter, such DMA sampling systems advise the CPU that the DMA operation has been completed, and the CPU resumes bus mastership.

Because the time difference between the request for bus mastership from such DMA sampling systems and the grant of bus mastership from the CPU may vary, an exact sampling rate is generally not maintained by such DMA sampling systems since sampling of the analog input signal occurs only after the grant of bus mastership in such DMA sampling systems.

Certain applications of DMA sampling system require that an exact sampling rate be maintained. For example, in fast-Fourier transform (FFT) processing, maintenance of an exact sampling rate is particularly critical to avoid the introduction of noise into the FFT processing algorithm. For example, assuming a dynamic range (i.e., the ratio of the specified maximum signal level capability of a system to its noise level) of 6 decibels per bit, a DMA sampler using an eight-bit sample potentially has a dynamic range of 48 decibels (8 bits×6 decibels per bit). However, an error in the sampling rate of as little as 1.5% translates into a 9.5 decibel degradation in dynamic range for the DMA sampling system. Such degradation is referred to as "aperture jitter".

SUMMARY OF THE INVENTION

An object of the present invention is to provide a DMA sampling system for sampling an analog input signal(s) at a substantially exact sampling rate to significantly reduce aperture jitter, and yet affording the advantage of reducing CPU processing time through the use of a DMA operation.

Another object of the present invention is to provide a capability for converting digital samples into a format corresponding to preliminary steps of an FFT processing algorithm before performing a DMA operation.

A further object of the present invention is to provide a DMA sampling system which is less susceptible to timing problems, for example, a clock slip, by implementing the structure performing the DMA operation as a data flow machine.

These objects are obtained by the DMA sampler herein disclosed. According to the present invention, there is provided a DMA sampler in which sampling circuitry is implemented as a finite state machine so that a substantially exact sampling rate is maintained. Upon the generation of a sample, the FFT sampling circuit notifies DMA circuitry of the existence of a sample to be transferred to a CPU memory. The DMA circuitry is implemented as a data flow machine so that DMA processing is initiated by the DMA circuitry upon notification of the existence of a sample from the FFT sampling circuitry. In response to such notification, the DMA circuitry requests bus mastership from the CPU and waits until bus mastership of the CPU bus is granted. The CPU is programmed to respond to the request for bus mastership within a time period sufficient for the sampling circuit to obtain the next sample. Upon receipt of bus mastership, the DMA circuit drives a CPU address bus with an address and drives the data bus with the sample to provide the sample to the CPU memory. Thereafter, the DMA circuitry returns bus mastership to the CPU and the DMA operation is completed. Because the DMA circuitry is implemented as a data flow machine so that the DMA circuitry requests bus mastership upon notification of the existence of a sample to be transferred to the CPU memory, the DMA circuitry helps to ensure that samples are not lost and is less susceptible to timing problems.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

Before specifically describing the preferred embodiments of the present invention, a general description of the present invention is given below.

Figure 15:
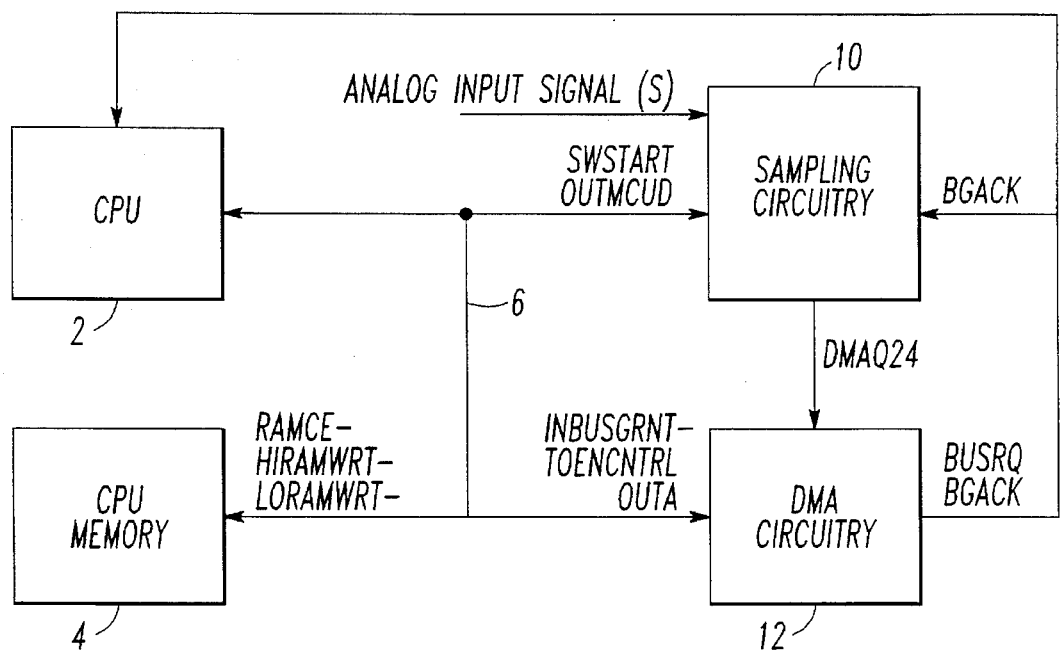
FIG. 15 is a generalized circuit diagram of the microprocessor-based system of FIG. 1.

Referring to FIG. 15, the microprocessor-based system employing the DMA sampler in accordance with the present invention generally includes a CPU 2, a CPU memory 4, sampling circuitry 10 and DMA circuitry 12. The sampling circuitry 14 and the DMA circuitry 12 may be referred to collectively as a "DMA sampler." The CPU 2 initiates sampling by the sampling circuitry 10 by generating the signal SWSTART. Upon activation of the signal SWSTART, the sampling circuitry 10 samples at least one analog input signal and generates the signal DMAQ24 to notify the DMA circuitry 12 that at least one sample has been obtained. In response to the signal DMA Q24, the DMA circuitry 12 issues a signal BUSRQ to request bus mastership from the CPU 2. In response to the signal BUSRQ, the CPU 2 generates the signal INBUSGRNT- to advise the DMA circuitry 12 of a grant of bus mastership. The DMA circuitry 12 acknowledges the grant of bus mastership by generating the signal BGACK which is provided to the CPU 2.

After a grant of bus mastership, the sampling circuitry 10 outputs a sample(s) as the signal OUTMCUD in response to the signal BGACK from the DMA circuitry 12. The DMA circuitry 12 generates and outputs an appropriate CPU memory address OUTA and controls the timing for writing the sample(s) to the CPU memory 4 using CPU bus 6. Thereafter, the CPU 2 resumes bus mastership in response to the deactivation of the signal BGACK.

In the above description with reference to FIG. 15, it should be noted that once sampling is initiated by the CPU 2 through generation of the signal SWSTART, sampling is performed by the DMA sampler without any dependence upon whether bus mastership has been granted to the DMA sampler. Accordingly, the DMA sampler is able to maintain a substantially exact sampling rate to avoid the degradation in performance caused by aperature jitter in prior art DMA sampling systems.

Next, a more detailed description of the preferred embodiments of the present invention, is given below.

The DMA sampler of the present invention is divided into two main elements: the sampling circuitry 10 (i.e., means for sampling) and the DMA circuitry 12 (i.e., means for performing a DMA operation). The sampling circuitry 10 is implemented as a finite state machine which performs an analog-to-digital (A/D) read operation to obtain digital samples from analog input signal(s) provided to the DMA sampler. The CPU 2 associated with the DMA sampler operates at a system clock rate having a period termed "SYSCLK". The sampling circuitry 10 is designed to perform at least one A/D read operation every 512 SYSCLKs.

Figure 16:
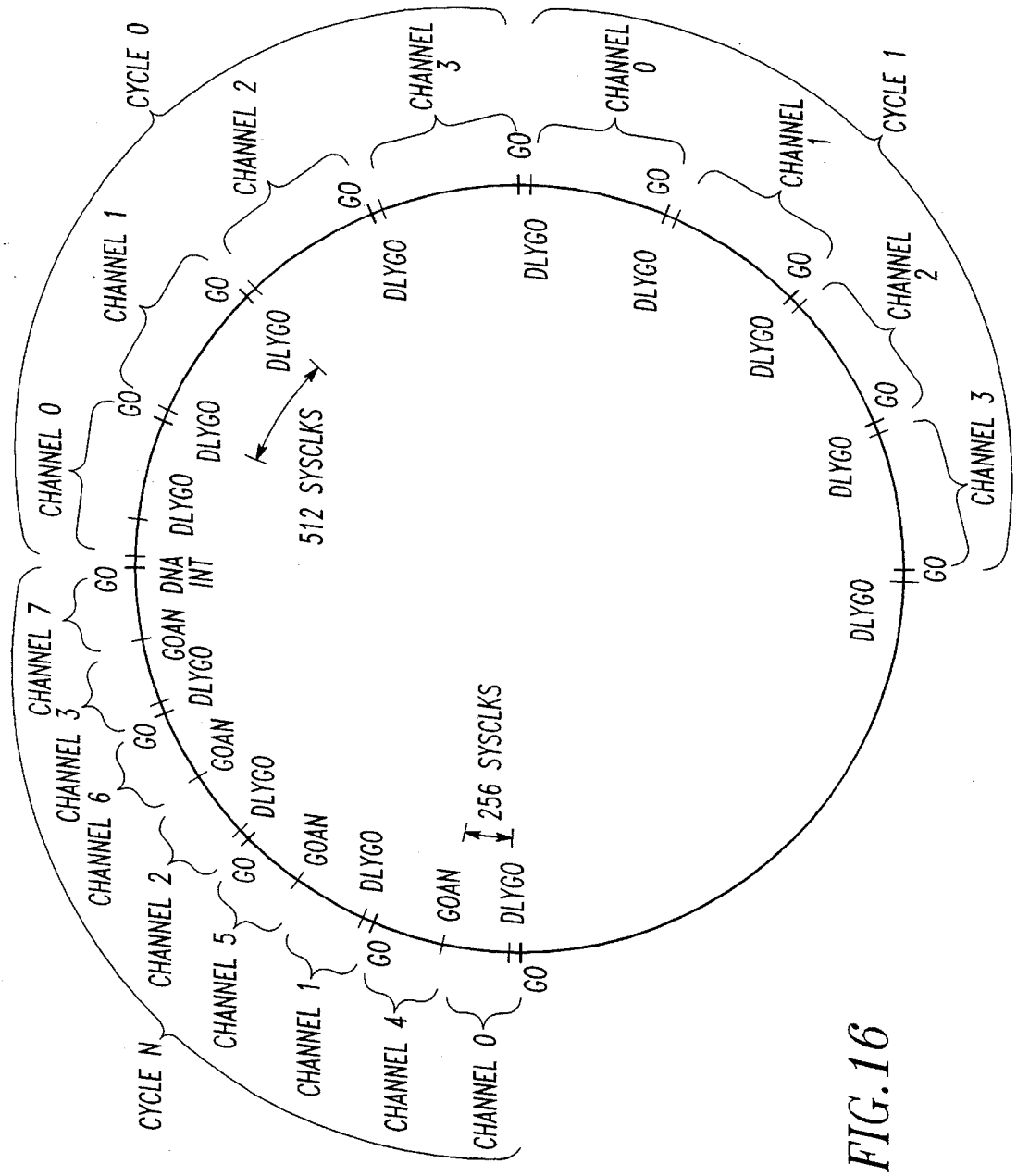
FIG. 16 is a timing diagram of the DMA sampler of the preferred embodiment of the present invention.

The sampling circuitry 10 is capable of sampling as many as eight analog input signals which are generally derived from sensors coupled to the DMA sampler. Accordingly, the sampling circuitry 10 generates an A/D address to select one of the analog input signals for sampling. The sampling circuitry 10 cycles the A/D address from zero to three in order to sample four analog input signals on four respective analog channels 0, 1, 2 and 3 as shown in FIG. 16. This cycling occurs for N−1 cycles, where N is a number designated by the CPU 2. In the present invention, N may have values of 32, 64, 128 or 256.

On the Nth cycle, the A/D read operation is performed every 256 SYSCLOCKS to obtain samples from all eight channels of the sampling circuitry 10 with the address sequence of 0, 4, 1, 5, 2, 6, 3 and 7. Such address sequence maintains an exact sampling frequency on channels 0, 1, 2 and 3 while also obtaining new data on analog channels 4, 5, 6 and 7 once per N cycles. Hereinafter, N cycles is referred to as a "look".

Samples from the sampling circuitry 10 are stored in the CPU memory 4 at a memory address derived from base addresses provided to the DMA circuitry 12 by the CPU 2 prior to sampling. These base addresses are referred to as BASE0, BASE1 and ANBASE. Samples corresponding to A/D address 0 are stored at CPU address locations BASE0 through BASE0+510, samples corresponding to A/D address 1 map to BASE0+512 through BASE0+1022, samples corresponding to A/D address 2 map to BASE0 +1024 through BASE0+1534, and samples corresponding to A/D address 3 map to BASE0+1536 through BASE0+2046. The above samples are referred to as "sample set 0" and correspond to one look for each of the channels 0, 1, 2 and 3.

After sampling is performed for one look, the CPU 2 may direct the DMA sampler to perform sampling for another look. In such case, the DMA circuitry 12 changes the base address constant from BASE0 to BASE1 to obtain another set of samples for channels 0, 1, 2 and 3, termed "sample set 1". After completion of the second look, if the CPU 2 directs the DMA sampler to perform another look, the DMA circuitry 12 changes the BASE address constant from BASE1 back to BASE0. The DMA circuitry 12 performs such toggling between BASE0 and BASE1 so that the CPU 2 has sufficient time to handle samples corresponding to a given look before such samples are written over in a subsequent look.

The samples corresponding to A/D address 4, 5, 6 and 7 are stored at memory locations ANBASE, ANBASE+2, ANBASE+4 and ANBASE+6, respectively. Thus, ANBASE is used as the base address for the last four analog channels regardless of the current sample set being sampled.

With the above addressing scheme, it will be noted that two memory spaces are allocated for each sample in the CPU memory 4. Accordingly, a sample may be split into upper and lower halves and written to the CPU memory 4 in two successive memory locations. However, in the description of the preferred embodiment, it is assumed that the CPU memory 4 has a sufficient bit size to accommodate each sample at one memory location, although other implementations of the CPU memory 4, the bit size of the CPU bus 6 and the sample size generated by the sampling circuitry 10 are possible, and may be readily implemented by those of ordinary skill in the art.

In the above sampling scheme, four analog input signals are sampled N times per look on channels 0, 1, 2 and 3, while another four analog input signals are sampled on analog channels 4, 5, 6 and 7 only once per look. This feature provides flexibility in sampling analog input signals provided to the DMA sampler since the CPU 2 may require more samples for a given analog input signal per look than other analog input signals, to operate effectively. For example, analog input signals from temperature sensors are generally less time variant than vibration sensors, so that analog input signals from temperature sensors may be sampled less frequently than analog input signals from vibration sensors.

Also in accordance with the present invention, an optional feature is provided to convert a sample of a given bit size, e.g., eight bits, into a sign-extended twos-complement code so that the samples are in a correct format for the preliminary step of some FFT algorithms. Thus, no other data scaling need be performed prior to performing these particular FFT algorithms. When other FFT algorithms are implemented on the DMA sampler of the present invention, this feature may be omitted.

The DMA circuitry 12 is implemented as a data flow machine in which processing initiates upon indication of the existence of a sample to be transferred from the sampling circuitry 10 to the CPU memory 4. The DMA circuitry 12 functions to request bus mastership from the CPU 2 and waits until mastership of the CPU bus 6 is granted. Upon receipt of bus mastership, the DMA circuitry 12 drives the CPU bus 6 with a CPU memory address derived from the appropriate base address as described above, and also drives the CPU bus 6 with the sample. The CPU memory 4 is then enabled and strobed to complete data storage of the sample, and bus mastership is returned to the CPU 2. In the present invention, the DMA sampler only maintains bus mastership for two SYSCLOCKs in a normal DMA operation. In the worst case, clock skew could cause three SYSCLOCKs from grant of bus mastership to and release of bus mastership by the DMA sampler. Therefore, processing performed by the CPU is only slowed a maximum of three SYSCLOCKs for every 512 SYSCLOCKs, or 0.6%, while a substantially exact sampling rate of the analog input signals is maintained.

Figure 1:
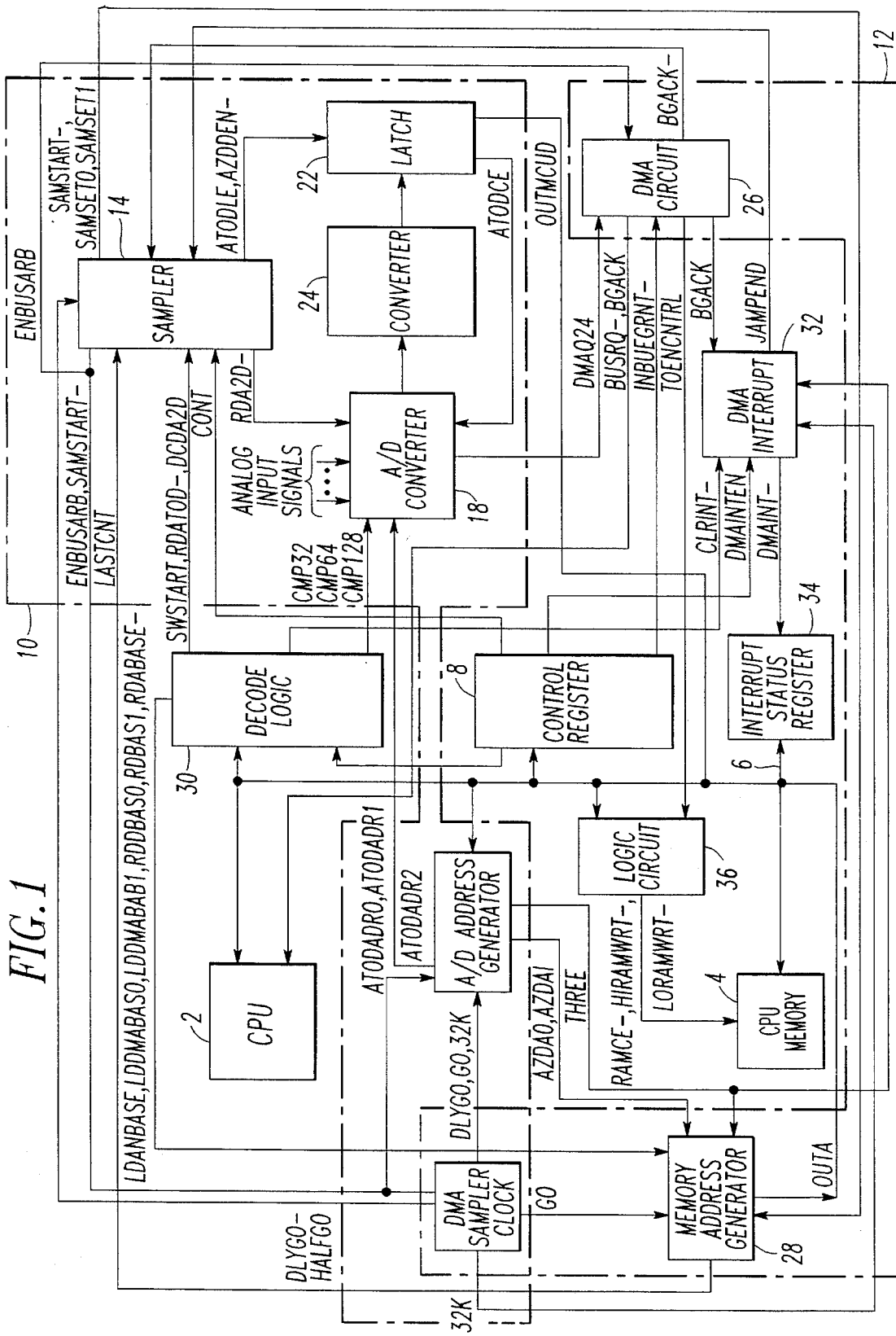
FIG. 1 is a block diagram of a microprocessor-based system employing the DMA sampler in accordance with the present invention.

Referring to FIG. 1, a description of a microprocessor-based system employing the DMA sampler of the preferred embodiment of the present invention, is disclosed below.

A CPU 2 is coupled to a CPU memory 4 by a CPU bus 6. Also coupled to the CPU bus 6 is control register 8 which the CPU 2 accesses with a specific address provided on the CPU bus 6. The CPU 2 uses the control register 8 to write instructions to the DMA sampler, and also to read the status of the DMA sampler.

The DMA sampler is divided into two parts: sampling circuitry 10 (i.e., means for sampling) and DMA circuitry 12 (i.e., means for performing a DMA operation). The sampling circuitry 10 includes sampler 14, DMA sampler clock 16, A/D converter 18, A/D address generator 20, latch 22 and converter 24. The DMA circuitry 12 includes DMA circuit 26, memory address generator 28 and the DMA sampler clock 16 which is common to both the sampling circuitry 10 and the DMA circuitry 12. A DMA interrupt circuit 32 and an interrupt status register 34 are also provided in the microprocessor-based system.

To initiate sampling, the CPU 2 addresses the control register 8 to activate or deactivate certain bits stored therein. The output of the control register S corresponding to these bits is provided to the decode logic circuit 30 which issues a signal SWSTART to the sampler 14 to start sampling by the DMA sampler. Also, the decode logic circuit 30 generates two signals RDATOD- and DCDA2D which are provided to the sampler 14 when the CPU 2 is instructed to read samples directly without intervention of the DMA sampler.

In response to the signal SWSTART from the decode logic circuit 30, the sampler 14 issues the signal ENBUSARB to the DMA sampler clock 16, the A/D address generator 20 and the DMA circuit 26, to enable bus arbitration between the DMA sampler and the CPU 2.

In response to either the signals RDATOD- and DCDA2D or the signal DMAQ24 in the sampler 14 based on the clock signal DLYGO- or the signal GOAN-, the sampler 14 issues the signals RDATOD- and A2DDEN- to control A/D converter 18 to read data on a selected channel, and to provide the sample obtained by the A/D converter 18 at the output thereof. Also, in response to the signal DCDA2D, the sampler 14 issues signal ATODCE to the latch 22 to enable the latch 22 to output data onto the CPU bus 6. The signal ATODCE is also provided to the A/D converter 18 to enable the A/D converter 18.

The sampler 14 also receives from the control register 8 the signal CONT which is used by the CPU 2 to command the DMA sampler to execute more than one look.

The DMA sampler clock 16 operates based on the system clock SYSCLK to generate two-phase clock signals PH1 and PH0. In the preferred embodiment, the two-phase clock signals PH1 and PH0 each have a frequency of 8 megahertz.

The two-phase clock signals PH1 and PH0 are used to generate signals GO, DLYGO, and HALFGO. The signal GO indicates the beginning of a cycle while the signal DLYGO is a signal delayed by one period of the signal PH0 from the signal GO. The signal HALFGO is used to indicate the start of the second half of one cycle. The DMA sampler clock 16 also generates a signal 32K which is used to provide timing for operations in the DMA sampler and the DMA interrupt circuit 32.

The A/D converter 18 activates a signal DMAQ24 which is provided to the DMA circuit 26 to indicate the fact that a sample has been obtained. When the DMA circuit 26 is enabled by the signal ENBUSARB from the sampler 14, the DMA circuit 26 issues a signal BUSRQ- to the control CPU 2. Accordingly, the CPU 2 is advised that the DMA sampler has requested bus mastership by the activation of the signal BUSRQ-. The CPU 2 is programmed to respond to a bus request from the DMA sampler indicated by the signal BUSRQ- within approximately 125 SYSCLOCKs. When the CPU 2 determines that it may relinquish bus mastership to the DMA sampler, the CPU 2 responds to the request for use of the bus by issuing the signal INBUSGRNT to the DMA circuit 26. In response to the signal INBUSGRNT the DMA circuit 26 resets the signal BUSRQ- and acknowledges the grant of bus mastership by providing the signal BGACK to the CPU 2. Upon receiving the signal INBUSGNT, the DMA sampler will provide a sample from the latch 22 to the CPU memory 4 and return bus mastership to the CPU 2 within 3 SYSCLOCKs.

The A/D converter 18 is provided with various control information from the control register 8 prior to the initiation of sampling. Such control information includes, for example, a designation of the number of bits to be obtained for each sample. Also, the A/D converter 18 is provided with at least one analog input signal, but when plural analog input signals are provided to the A/D converter 18, provision must be made to address the channels of the respective analog input signals.

This function is provided by the A/D address generator 20 which uses the clock signals DLYGO and GO to generate the signals ATODADR0, ATODADR1 and ATODADR2. These signals are provided as a three-bit input signal to the A/D converter 18 so that as many as eight channels may be addressed by the A/D address generator 20.

The A/D address generator 20 also functions to provide the signals A2DA0 and A2DA1 to the memory address generator 28 for use in generating appropriate CPU memory addresses during a look. Also, the A/D address generator 20 generates a signal THREE which is provided to the DMA interrupt circuit 32 and combined with other signals to generate an interrupt to the CPU 2. The A/D address generator 20 is reset by a signal SAMSTART- from the sampler 14 which operates to reset the A/D address generator 20 at the beginning of a cycle.

Prior to instructing the DMA sampler to execute sampling, the CPU 2 loads base addresses BASE0, BASE1 and ANBASE into the memory address generator 28. To perform this function, the CPU 2 generates an appropriate address INA which is decoded in the decode logic circuit 30 to produce the signals LDANBASE, LDDMABAS0 and LDDMABAS1. The CPU 2 also generates and provides the signals INA18 and WRITE to the decode logic circuit 30 to generate one of the signals RDDBASE0, RDBASE1 and RDABASE- when the CPU 2 reads samples from the CPU memory 4 or when the DMA circuit 26 writes a sample to the CPU memory 4 by generating the signal TOENTCNTL. The resulting signal is used to output an appropriate CPU memory address to the CPU memory 4. In the memory address generator 28, the base addresses BASE0, BASE1 and ANBASE correspond to the most significant bits for generating CPU memory addresses for the sample set 0, the sample set i and the samples corresponding to channels 4, 5, 6 and 7, respectively.

As the next most significant bits, the memory address generator 28 uses the signals A2DA0 and A2DA1 from the A/D address generator 20. These bits merely sequence for each cycle so that sample sets for channels 0, 1, 2 and 3 and 4, 5, 6 and 7 are stored in separate memory spaces in the CPU memory 4.

As the least significant bits which are used to address CPU memory 4, the memory address generator 28 counts occurrences of the signal GO to maintain a record of the number of cycles of samples which have been completed while a look is progressing. The count value is used as the least significant bits to address the CPU memory 4 only for sample sets 0 and 1 (i.e., the samples for channels 4, 5, 6 and 7 are only obtained once per look so that the coupling of ANBASE with the signals A2DA0 and A2DA1 is sufficient to generate the CPU memory addresses for samples from channels 4, 5, 6 and 7). The count value is also input to appropriate logic gates to output a signal preLASTCNT to the sampler 14 to indicate the occurrence of the end of a look.

The count value of the least significant bits of the memory address generator 28 are reset by the signal SAMSTART- from the sampler 14. In addition, the sampler 14 provides signals SAMSET0 and SAMSET1 to the memory address generator 28 to enable the base addresses BASE0 and BASE1, respectively, to be output from the memory address generator 28.

The DMA circuit 26 and the CPU 2 generate signals RAMCE-, HIRAMWRT- and LORAMWRT- to enable a sample to be written into the CPU memory 4, and to write the high and low sample words into the CPU memory 4 from the latch 22, respectively.

The DMA interrupt circuit 32 receives the signals 32K, THREE and BGACK, and generates the signals SAMPEND and DMAINT to indicate to the sampler 14 and the CPU 2, respectively, the occurrence of the end of a look. Upon handling of the interrupt indicated by the signal DMAINT, the CPU 2 issues the signal CLRINT- to deactivate the DMA interrupt circuit 32.

A specific description of the components used to implement each of the elements of the preferred embodiment of the present invention as shown in FIG. 1 is given below.

In the preferred embodiment, the CPU 2 is an MC68332 manufactured by Motorola Corporation. The CPU 2 is coupled to the CPU memory 4, a conventional 32K×16-bit RAM, via the CPU bus 6. The CPU bus 6 includes an address bus and a data bus.

The control register 8 is coupled to the CPU bus 6 and is addressed by the CPU 2 with a particular address, so that the CPU 2 may write instructions to the DMA sampler or read the control register 8 to determine the status of the DMA sampler.

Figure 2:
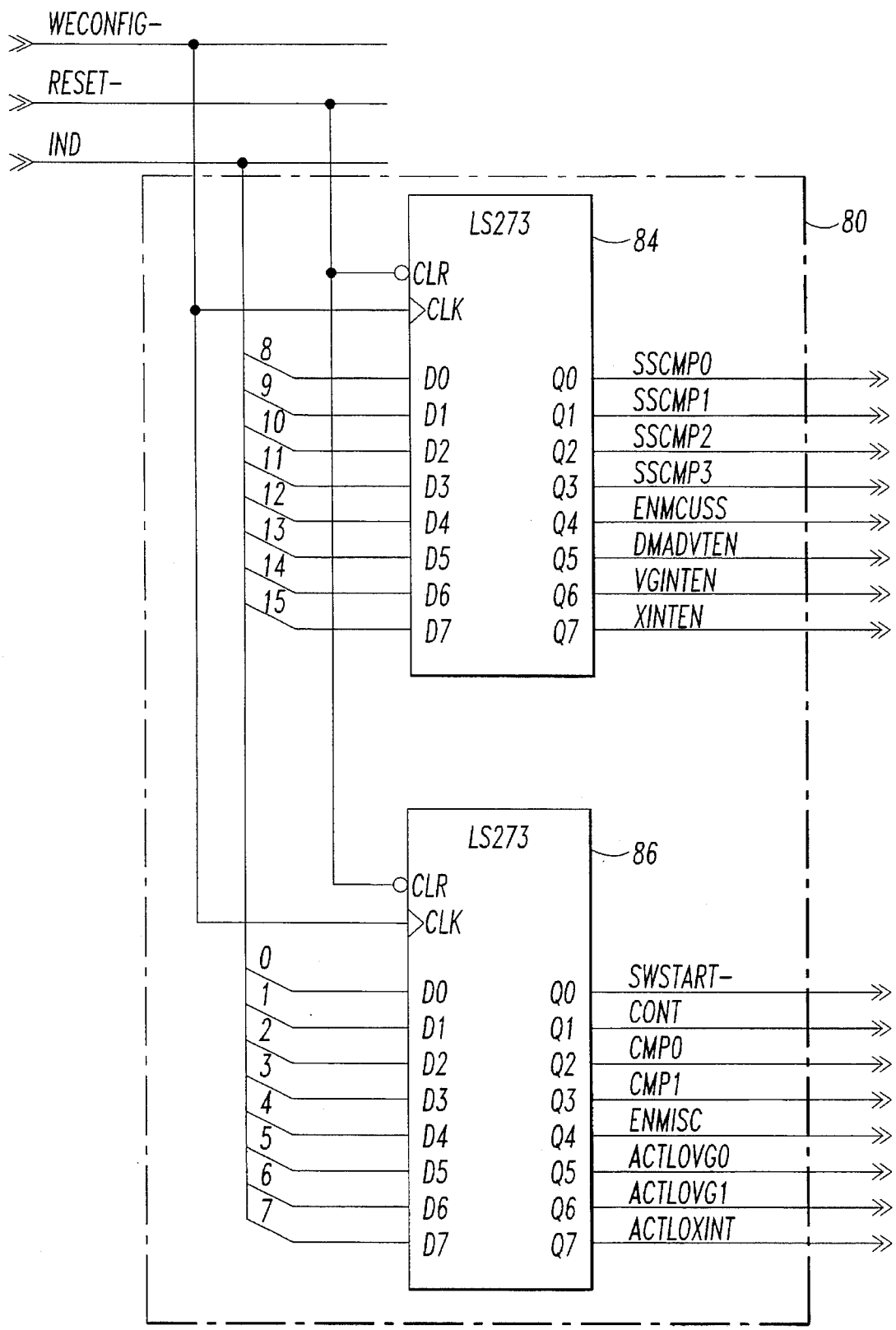
FIG. 2 is a circuit diagram of part of the control register of FIG. 1.
Figure 3:
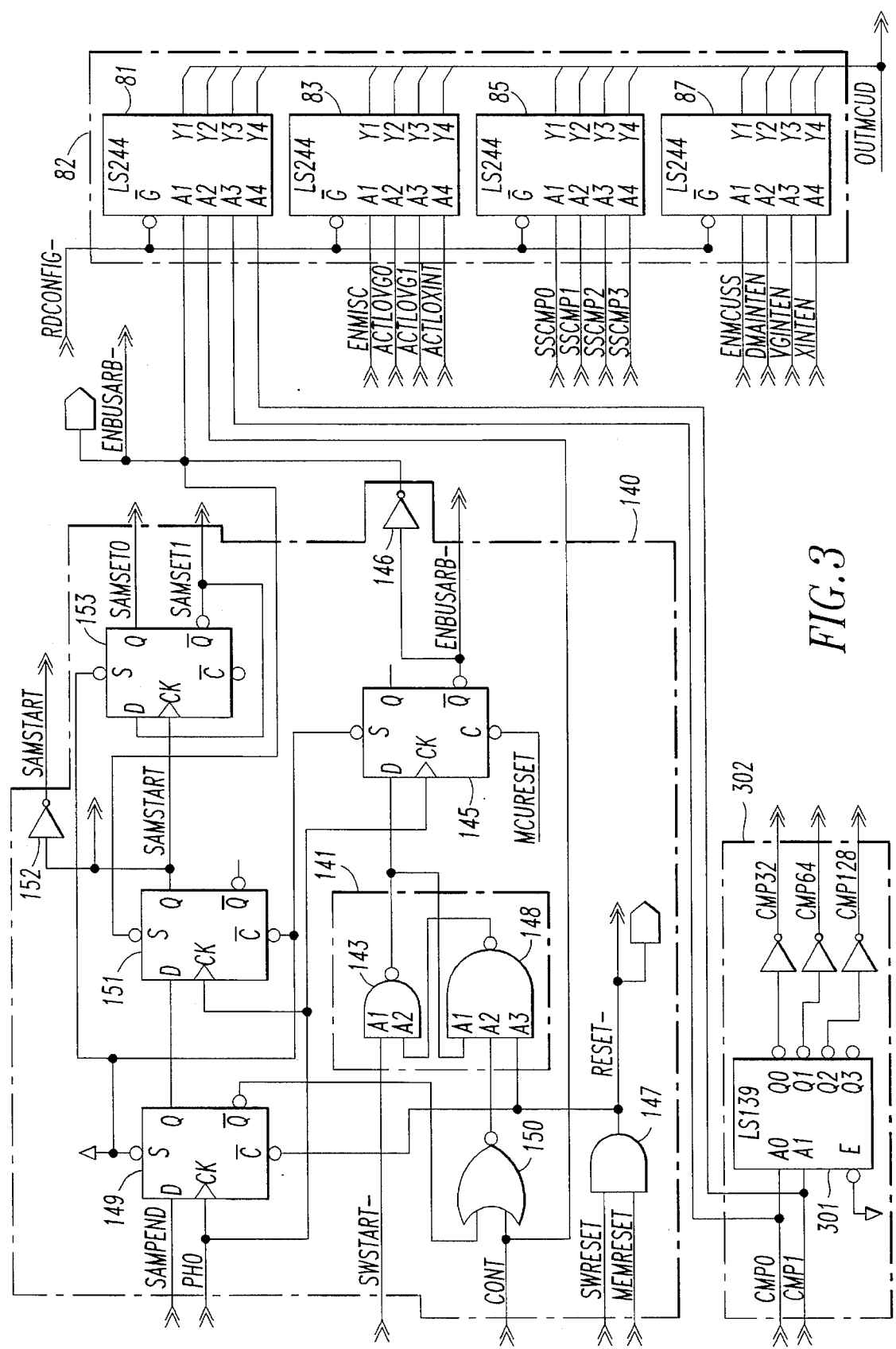
FIG. 3 is a circuit diagram of part of the control register, part of the decode logic circuit and part of the sampler of FIG. 1.

The control register 8 includes control register part 80 of FIG. 2 and control register part 82 of FIG. 3. The control register part 80 is provided with a signal RESET- which is used to clear TTL L273 registers 84 and 86 when system and DMA sampler resets occur, for example, upon start-up of the microprocessor based system. The signal WECONFIG- is a control signal generated by the CPU 2 to write instructions to the control register 8 on lines designated IND. By writing to the control register 8 using the signals WECONFIG- and IND, the CPU 2 is able to control operations of the DMA sampler by activating or deactivating particular bits of the signal IND.

The signals generated by each bit stored in the LS373 registers 84 and 86 provide a variety of functions and capabilities. The signals SSCMP0, SSCMP1, SSCMP2 and SSCMP3 provide the capability to control multiple DMA samplers in accordance with the present invention, using a single CPU. Signal ENMCUSS is used by the CPU 2 to enable a particular DMA sampler in a multi-DMA sampler environment.

Signal DMAINTEN is used to enable or disable the DMA interrupt circuit 32 since there may be occasions on which the CPU 2 is engaged in processing which should not be interrupted by the DMA sampler. The signals VGINTEN and XINTEN are used to enable and disable two additional interrupts. VGINTEN controls voltage glitch interrupt enable and XINTEN controls a general purpose external interrupt enable. The control register part 80 also stores a bit for the signal CONT. The signal CONT is activated by the CPU 2 when the CPU 2 requires the DMA sampler to provide samples for more than one look. Accordingly, the signal CONT designates a continuous sampling mode.

The control register part 80 further stores the signals CMP0 and CMP1 which are provided to the decode logic circuit 30 to designate the number of bits per sample to be obtained by the A/D converter 18. In the following description, it is assumed that the number of bits per sample is 16 bits, though the signals CMP0 and CMP1 provide the capability for larger sample sizes.

In addition, the circuit contains an IEEE 1149.1 compliant boundary scan to test the input and output pins of the DMA sampler.

Bits corresponding to the signals ACTLOVG0, ACTLOVG1 and ACTLOXINT are stored in the control register part SO to select whether external interrupts are active high or active low signals. The signal SWSTART- is used to start the sampling process after the circuit has been configured using the control register 8.

Referring to FIG. 3, the control register part 82 includes four TTL LS244 latches 81, 83, 85 and 87. The signals from the control register part 80 are provided to the control register part 82 directly, with the exception of the signal ENBUSARB- which is generated in circuitry in the sampler 14, as more fully described in a later section.

The LS244 latches 81, 83, 85 and 87 are provided with a control signal RDCONFIG- which is activated by the CPU 2 when the CPU 2 reads the control register 8 to determine the status of the DMA sampler. When the signal RDCONFIG- is strobed low, the control register part 82 outputs a 16-bit data word designated OUTMCUD which is provided to the CPU 2 on the data bus of the CPU bus 6.

Figure 4:
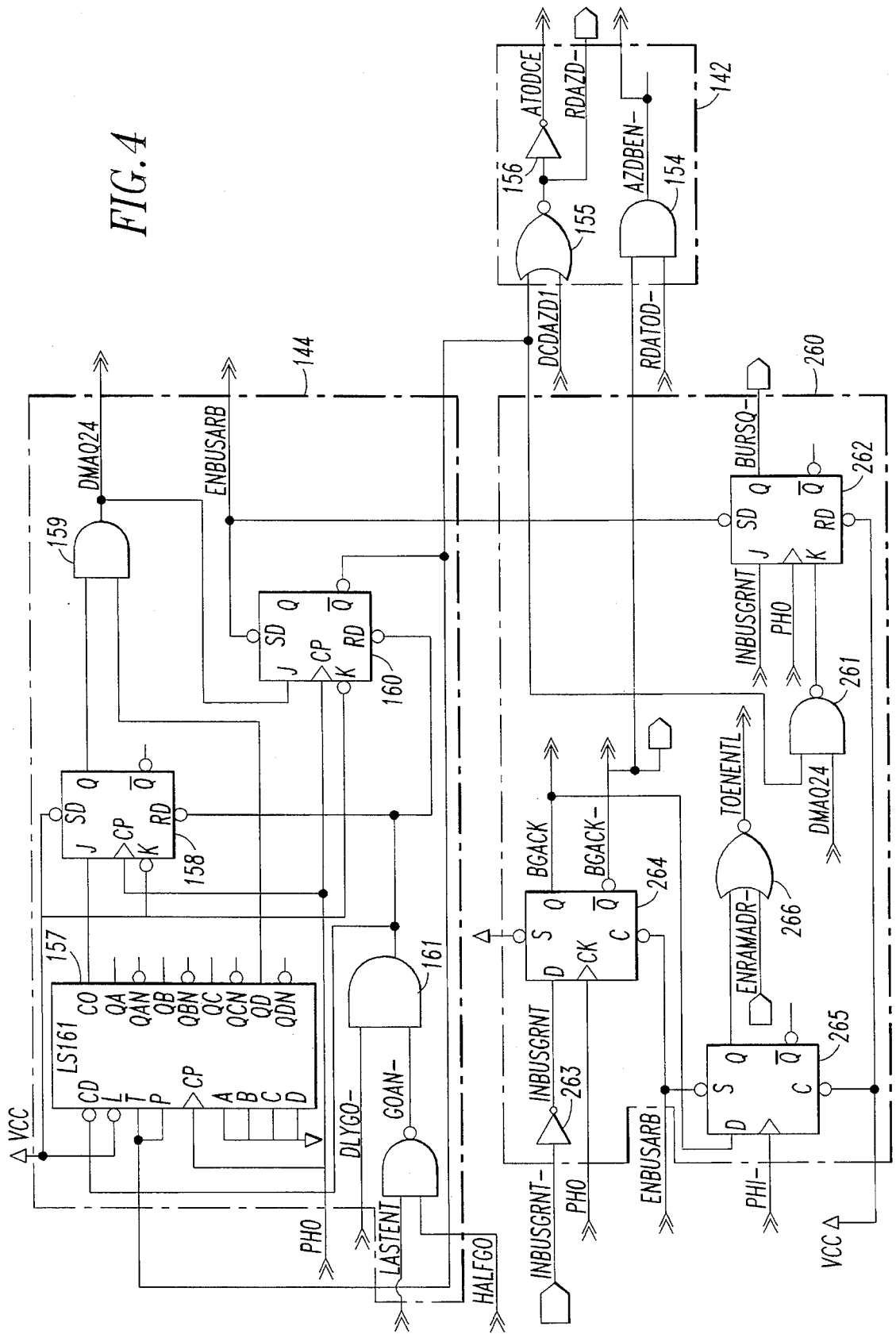
FIG. 4 is a circuit diagram of parts of the sampler and a part of the DMA circuit of FIG. 1.

The sampler 14 includes sampler part 140 of FIG. 3, and sampler parts 142 and 144 of FIG. 4. As previously explained, when the CPU 2 requires the DMA sampler to begin sampling, the CPU 2 writes to the control register 8 to activate the signal SWSTART-. The signal SWSTART- is provided to the sampler part 140 at one input of NAND gate 143 of sampler latch 141. When the signal SWSTART- is strobed low, the output of sampler latch 141 is caused to enter a high-voltage state. Upon activation of the signal PH0 provided to the clock input of the D flip-flop 145, the output $\overline{Q}$ of the D flip-flop 145 strobes low. This output is used to generate the signal ENBUSARB- which is provided from the sampler 14 to the DMA sampler clock 16, the A/D address generator 20 and the DMA circuit 26 to enable bus arbitration between the DMA sampler and the CPU 2. The output $\overline{Q}$ of the D flip-flop 145 is also provided through inverter 146 to produce the signal ENBUSARB, which is merely an inversion of the signal ENBUSARB-. The signal ENBUSARB is latched in LS244 latch 81.

The sampler part 140 is also provided with control signals SWRESET- and MCURESET- which are used to designate a DMA sampler reset and a system reset, respectively. The signals SWRESET and MCURESET- are provided to AND gate 147 to generate the signal RESET-. The signal RESET- is provided to one input of NAND gate 148 to cause the output of sampler latch 141 to go to a low-voltage state. Such operation causes the signal ENBUSARB- to become deactivated so that bus arbitration between the DMA sampler and the CPU 2 is inhibited. Also, the D flip-flip 145 is cleared by the signal MCURESET which is merely the inversion of the signal MCURESET-. The clearing of the flip-flop 145 by the signal MCURESET also inhibits bus arbitration upon the occurrence of the system reset.

The sampler part 140 is further provided with the signal SAMPEND from the DMA interrupt circuit 32. The signal SAMPEND indicates the end of a look and is provided to the input of the D flip-flop 149. When activated, the signal SAMPEND is clocked into the flip-flop 149 upon activation of clock signal PH0 from the DMA sampler clock 16. The output $\overline{Q}$ of the flip-flop 149 is brought to a low-voltage state and provided as one of the inputs to NOR gate 150. The other input of the NOR gate 150 is the signal CONT which is provided from the CPU 2 via the control register 8 to indicate whether the DMA sampler is to obtain samples for more than one look. When the DMA sampler is merely to perform sampling for one look, the signal CONT is deactivated so that the output of NOR gate 150 is brought to a high-voltage state. This causes the sampler latch 141 to be reset and the signals ENBUSARB- and ENBUSARB which are derived from the output of the D flip-flop 145, are deactivated so that bus arbitration between the DMA sampler and the CPU 2 is inhibited.

On the other hand, when the signal CONT is activated, the output of the NOR gate 150 is brought to a low-voltage state so that the output of the sampler latch 141 is brought to a high-voltage state. Accordingly, the D flip-flop 145 is set upon activation of the clock signal PH0 so that the output $\overline{Q}$ of the D flip-flop 145 is brought to a low-voltage state. Accordingly, bus arbitration between the DMA sampler and the CPU 2 is enabled for another look.

When the signal SAMPEND is clocked into D flip-flop 149 upon the occurrence of clock signal PH0, the output $\overline{Q}$ the D flip-flop 149 is set to a high-voltage state. Upon the next occurrence of the clock signals PH0, the flip-flop 151 is set. Accordingly, the output Q of the D flip-flop 151 is at a high-voltage state. The output Q of the flip-flop 151 is used to derive the signal SAMSTART which is thus activated to designate the beginning of a look. Also, an inverted version of the signal SAMSTART is produced at the output of inverter 152. The signals SAMSTART and SAMSTART- are provided to the A/D address generator 20 and the memory address generator 28 to bring each to the proper state for the beginning of a look.

The signal SAMSTART is also provided to the clock input of D flip-flop 153 to generate the signals SAMSET0 and SAMSET1. The $\overline{Q}$ output of the D flip-flop 153 is fed back to the input of the D flip-flop 153 so that the outputs Q and $\overline{Q}$ of the D flip-flop 153 corresponding to the signals SAMSET0 and SAMSET1, respectively, toggle once every look. The signals SAMSET0 and SAMSET1 are provided from the sampler 14 to the memory address generator 28 so that sample set 0 and 1 are written into the CPU memory 4 at different areas of the CPU memory 4. This feature provides the CPU 2 with sufficient time to handle processing of the samples of a given sample set before such samples are written over in a subsequent look.

Referring to FIG. 4, the sampler part 142 is provided with the signals DCDA2D and RDATOD- from the decode logic circuit 30. As previously explained, the signals DCDA2D and RDATOD- are generated by the CPU 2 when the CPU 2 requires a sample from the A/D converter 18 through the latch 22 directly without intervention by the DMA sampler.

The signal RDATOD- is provided as one input to AND gate 154 and, when activated, causes the signal A2DDEN- at the output of AND gate 154 to be activated. A sample stored in the latch 22 is thus caused to be output on the data bus of the CPU bus 6.

The signal DCDA2D is provided to NOR gate 155 of the sampler part 142 to generate the signal RDA2D- to cause the A/D converter 18 to sample one of the channels. The signal RDA2D- is also provided to inverter 156 to generate the signal ATODCE to enable the latch 22 and the A/D converter 18.

The sampler part 144 provides the function of generating the appropriate timing for bus requests issued from the DMA circuit 26. The sampler part 144 includes counter 157 which, at its clock input, receives the signal PH0 and activates a carry out every 16 pulses of the signal PH0 as well as an output QD corresponding to the state of the most significant bit QD of the counter 157.

The carryout output of the counter 157 is provided to the J input of J-K flip-flop 158 which receives at its clock input the signal PH0. Thus, on the 16th pulse of the signal PH0, the J-K flip-flop 158 is set. The Q output of the J-K flip-flop 158 is provided to one input of AND gate 159 while the most significant bit QD of the counter 157 is provided to the other input of the AND gate 159 to generate the signal DMAQ24. The signal DMAQ24 is provided to the J input of J-K flip-flop 160 to set the J-K flip-flop 160 when the signal DMA24 and the clock input PH0 of J-K flip-flop 160 are activated. The signal ENBUSARB is provided to the set data input of the J-K flip-flop 160 which is active low so that data may be set in the J-K flip-flop 160 when the signal ENBUSARB is deactivated.

The $\overline{Q}$ output of J-K flip-flop 160 is fed back to the T and P inputs of the counter 157 to enable and disable counting to provide a substantially exact and repeatable frequency for the signal DMAQ24. The $\overline{Q}$ output of the J-K flip-flop 160 is also provided to an input of the NOR gate 155 of the sampler part 142 to activate the signal RDA2D- once every 16 pulses of the signal PH0 relating to the signals DLYGO- or GOAN. The $\overline{Q}$ output of the J-K flip-flop 160 is also provided to the DMA circuit 26 and used together with the signal DMAQ24 to generate a short pulse which is in turn used to generate the signal BUSRQ-.

The signal DMAQ24 initiates the A/D read cycle to begin the sampling process. During the first N–1 cycles of a look, the signal DLYGO- generated by the DMA sampler clock 16, initiates the signal DMAQ24. During the Nth cycle of a look, both of the signals DLYGO- and GOAN- initiate the signal DMAQ24 so that sampling for as many as eight channels may be completed during the Nth cycle. The signal DLYGO- occurs every 512 SYSCLKs during the sampling process, and HALFGO- occurs 256 SYSCLKs after DLYGO-. HALFGO- is combined with the signal LASTCNT from the memory address generator 28 in NAND gate 166 to create signal GOAN- which is activated only during the Nth cycle of a look.

Figure 5:
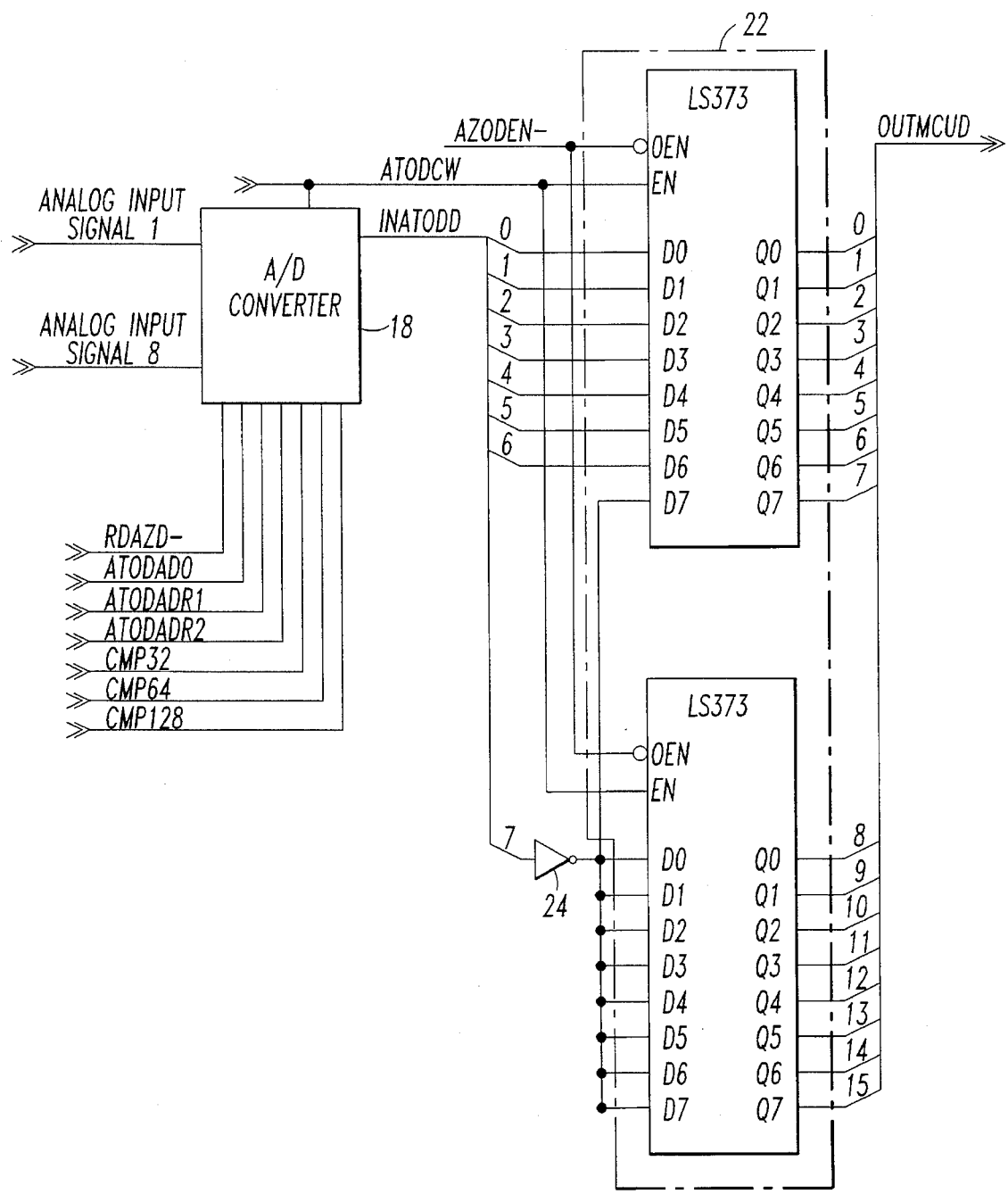
FIG. 5 is a circuit diagram of the A/D converter, the converter and the latch of FIG. 1.

Referring to FIG. 5, the A/D converter 18, the converter 24 and the latch 22 are described in greater detail. The A/D converter 18 is a conventional device which includes eight channels in the preferred embodiment for sampling analog input signals provided to each channel. A specific channel is addressed by the signals ATODADR0, ATODADR1 and ATODADR2 which are provided from the A/D address generator 20. In addition, the signals CMP0 and CMP1 from the control register 8 are decoded in decode logic circuit 30 to provide the signals CMP32, CMP64 and CMP128. More specifically, referring to FIG. 3, the signals CMP0 and CMP1 are provided to the A0 and A1 inputs, respectively, of TTL LS139 decoder 301 of the decode logic part 302. Depending on the states of the signals CMP0 and CMP1, one of the outputs Q0, Q1 and Q2 of the LS1 139 decoder 301 are activated and inverted by a respective one of the inverters 303, 304 and 305 to generate the signals CMP32, CMP64 and CMP128. The signals CMP32, CMP64 and CMP128 are provided to the A/D coverter 18, as shown in FIG. 5, to instruct the A/D converter 18 of the required number of samples per look. As previously explained, in the description of the preferred embodiment, it has been assumed that CMP0 and CMP1 designate a 16-bit sample size.

The A/D converter 18 is also provided with the signals ATODCE and RDA2D- to enable the A/D converter to output data to the latch 22 and to control the A/D converter 18 to sample one of the channels, respectively. The sample output from the A/D converter 18 designated as INATODD is provided to the latch 22 when the signal ATODCE is activated.

The converter 24 is merely an inverter which receives the sign bit of the sample output from the A/D converter 18, and inverts and extends the sign bit provided to the latch 22. Thus, the sample is converted into a sign-extended twos-complement sample appropriate for the preliminary steps of some FFT algorithms. The converter 24 is optional and, of course, may be omitted for applications which do not require sign-extended twos-complement samples.

The latch 22 is operated under control of the signal ATODCE to latch the sample provided from the A/D converter 18. The latch 22 is further controlled by the signal A2DDEN- to output a 16-bit signal onto the data bus of the CPU bus 6.

Figure 6:
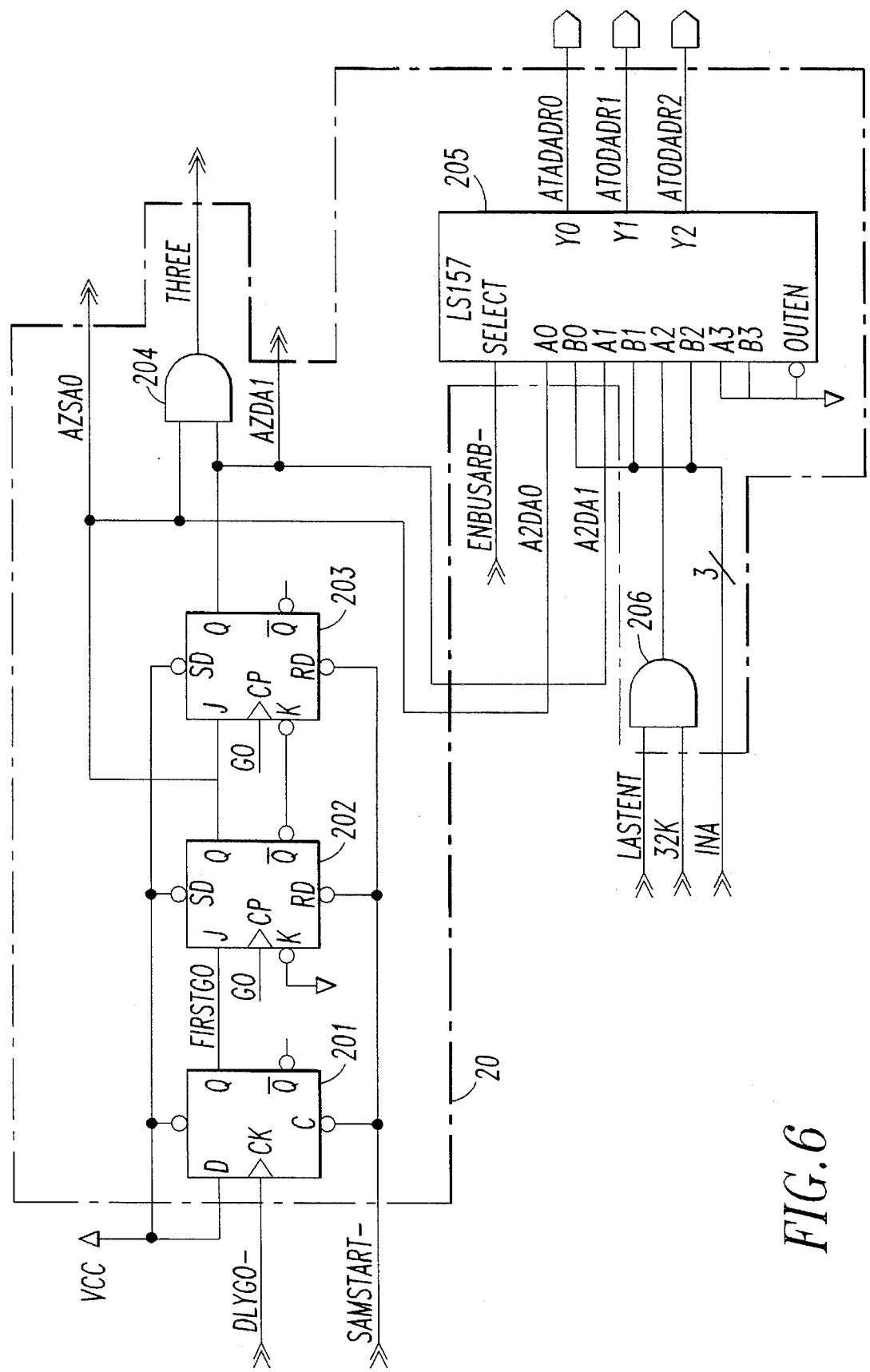
FIG. 6 is a circuit diagram of the A/D address generator of FIG. 1.

Referring to FIG. 6, the A/D address generator 20 receives the signal SAMSTRT- from the sampler 14 to clear D flip-flop 201 and J-K flip-flops 202 and 203 at the beginning of a look. The input to D flip-flop 201 is tied to $V_{CC}$ so that the output Q of the flip-flop 201 is set upon activation of the signal DLYGO provided to the clock input of the D flip-flop 201. The Q output of the D flip-flop 201 is provided to the J input of J-K flip-flop 202 while the output Q is provided to the J input of the J-K flip-flop 203. The active low input K of J-K flip flop 202 is tied to a low-voltage state while the output $\overline{Q}$ of J-K flip-flop 202 is provided to the active low input K of J-K flip-flop 203. The output Q of the J-K flip-flop 202 is used to generate the signal A2DA0 while the output Q of the J-K flip-flop 203 is used to generate the signal A2DA1. Accordingly, the signals A2DA0 and A2DA1 progress through a sequence with four stages every cycle. The signals A2DA0 and A2DA1 are provided to the memory address generator 28 for use with other signals to generate CPU memory addresses for storing samples in the CPU memory 4.

The signals A2DA0 and A2DA1 are also provided to AND gate 204. When the signals A2DA0 and A2DA1 are both in high-voltage states, the signal THREE output from AND gate 204 is activated. The signal THREE is provided to the memory address generator 28 and the DMA interrupt circuit 32 to generate memory addresses as well as the signal DMAINT-, respectively.

The signals A2DA0 and A2DA1 are provided to the A0 and A1 inputs of TTL LS157 multiplexer 205. The A2 input of the LS157 multiplexer 205 is provided from AND gate 206 which uses the signals LASTCNT and 32K as input signals. The signal LASTCNT is generated by the sampler 14 and is activated only during the Nth cycle of a look. The signal 32K from the DMA sampler clock 16 is therefore used to toggle the output of the AND gate 206 provided to input A2 of the LS157 multiplexer 205 every 256 SYSCLOCKs. Accordingly, the outputs Y0, Y1 and Y2 of the LS157 multiplexer 205 are used to address channels 4, 5, 6 and 7 of the A/D converter 18 while maintaining an exact sampling rate on channels 0, 1, 2 and 3 of the A/D converter 18. As the select input, the LS157 multiplexer 205 is provided with the signal ENBUSARB- from the sampler 14 so that the outputs Y0, Y1 and Y2 of the LS157 multiplexer 205 are derived from the signals A2DA0 and A2DA1 together with the output of the AND gate 206. On the other hand, when the signal ENBUSARB- is deactivated, the CPU may provide an address INA to the B0, B1 and B2 inputs of the LS157 multiplexer 205 to directly address one of the 8 channels of the A/D converter 18. Inputs A3, B3 and output enable of the LS157 multiplexer 205 are tied to a low-voltage level.

Figure 7:
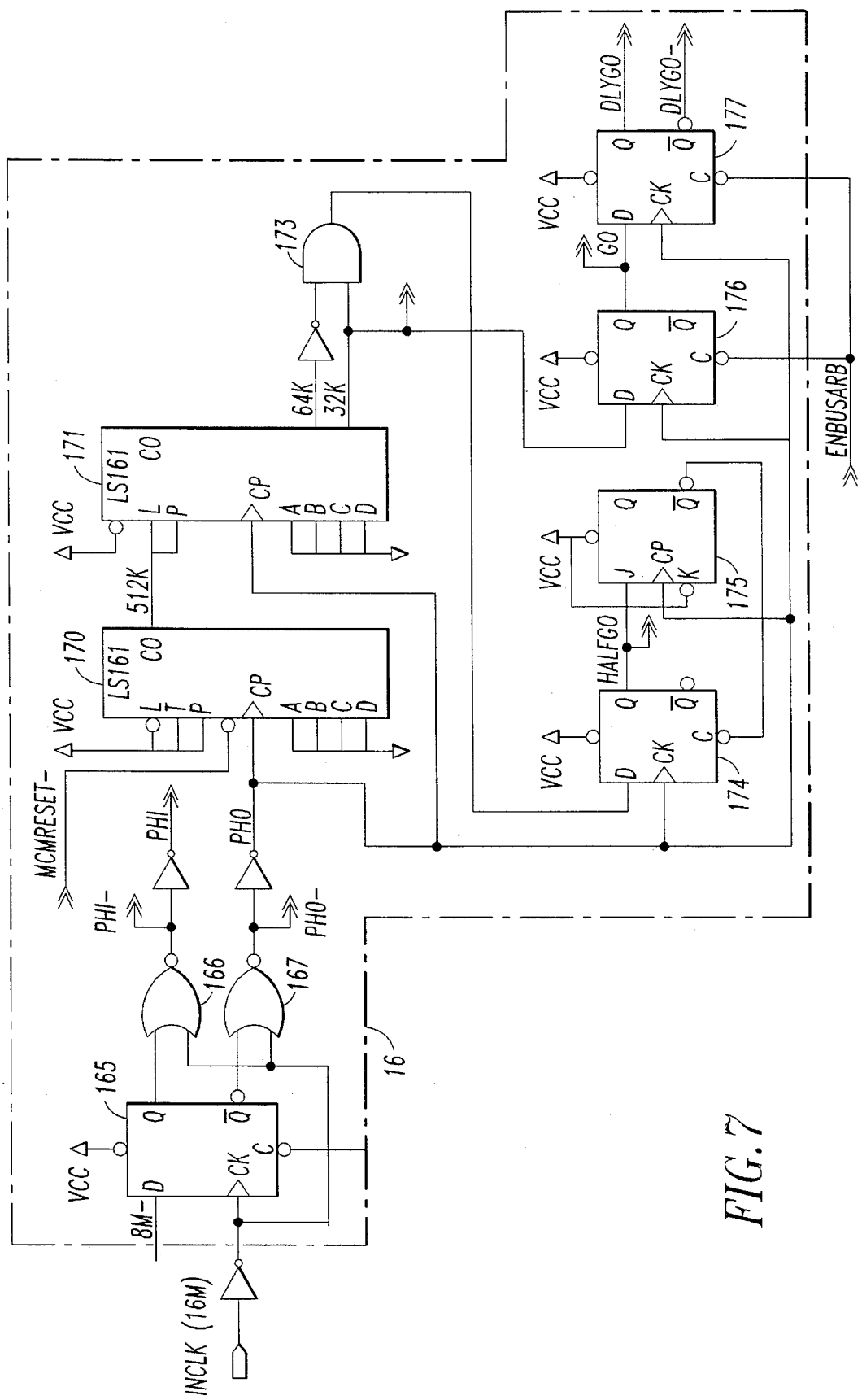
FIG. 7 is a block diagram of the DMA sampler clock of FIG. 1.

Referring to FIG. 7, the DMA sampler clock 16 is provided with an 8 megahertz signal and a 16 megahertz signal INCLK. These input signals are derived from the system clock. The 8 megahertz signal is provided to the D input of D flip-flop 165 while the signal INCLK is provided to the clock input of the D flip-flop 165. The Q and $\overline{Q}$ outputs of the D flip-flop 165 are provided to one input of OR gates 166 and 167, respectively, which each receive the signal INCLK at their other inputs. The outputs of the OR gates 166 and 167 are the signals PH1- and PH0- which together provide a two-phase clock signal for controlling the operations of the DMA sampler. The signals PH1- and PH0- are provided to inverters 168 and 169, respectively, to generate the signals PH1 and PH0 which are inverted versions of the signals PH1- and PH0-, respectively.

The signal PH0 is provided to the clock input of TTL LS161 counter 170. The LS161 counter 170 acts as a divide-by-16 frequency divider, and the carry out of the LS161 counter 170 is provided to inputs L and P of LS161 counter 171. This signal is further frequency-divided by the LS161 counter 171 to generate the signals 64K and 32K under control of the signal PH0 which is provided to the clock input of the LS161 counter 171. The signal 32K is provided to the A/D address generator 20 for use in generating the input signal to input A2 of the LS157 multiplexer 205. Also, the signal 32K is provided to the DMA interrupt circuit 32 for use in generating the signal DMAINT- to interrupt the CPU 2 at the end of a look.

The signal 64K is provided to inverter 172, and the inverted version of the signal 64K is provided to one input of AND gate 173. At the other input, the AND gate 173 receives the signal 32K to generate a signal which indicates the completion of one-half of a cycle. This signal is provided to the D input of D flip-flop 174 which receives the signal PH0 at its clock input. The output Q of the D flip-flop 174 is the signal HALFGO which is provided to the sampler 14 for use in generating the signal GOAN-. The signal HALFGO is provided to J-K flip-flop 175 having a $\overline{Q}$ output which is fedback to the clear input of the D flip-flop 174 so that the signal HALFGO is activated only during one period of the signal PH0.

The signal 32K is also provided to the D input of D flip-flop 176 having a clock input receiving the signal PH0. The Q output of the D flip-flop 176 is used to generate the signal GO which indicates the beginning of a cycle. The signal GO is provided to the A/D address generator 20 for use in generating the signals A2DA0 and A2DA1. The signal GO is provided as well to the memory address generator 28 for use in generating appropriate addresses for storing samples in the CPU memory 4. The signal GO is further provided to the D input of D flip-flop 177 receiving the signal PH0 at its input. The outputs Q and $\overline{Q}$ of the D flip-flop 177 are used to generate the signals DLYGO and DLYGO-. The signals DLYGO and DLYGO- are provided to the sampler 14 and the A/D address generator 20. The D flip-flops 176 and 177 are cleared when the signal ENBUSARB provided to the clear inputs of the D flip-flops 176 and 177, is deactivated so that the signals GO, DLYGO and DLYGO- are in appropriate states at the beginning of sampling by the DMA sampler.

Referring back to FIG. 4, DMA circuit part 260 receives the signal DMAQ24 and the output $\overline{Q}$ of the J-K flip-flop 160 from the sampler part 144. These signals are used to generate a pulse at the output of NAND gate 261 which is provided to the active-low K terminal of J-K flip-flop 262. The J-K flip-flop 262 is further provided with the signal PH0 as its clock input, and activates the signal BUSRQ- when the K terminal of the J-K flip-flop 262 is strobed low during activation of the signal PH0.

Bus requests are routed directly to the CPU 2 after being gated by signal ENBUSARB which is set in the control registers by the CPU 2. Specifically, the CPU initiates the signal SWSTART- which sets ENBUSARB to active. ENBUSARB being active allows the signal BUSRQ- to be generated directly to the CPU 2.

As previously explained, the CPU 2 will respond to the signal BUSRQ- by generating the signal INBUSGRNT. The signal INBUSGRNT is provided to the J terminal of the J-K flip-flop 262 to set the J-K flip-flop 262 and thereby deactivates the signal BUSRQ-.

In addition, the signal INBUSGNT- is provided to inverter 263 of the DMA circuit part 260 to generate the signal INBUSGRNT. The signal INBUSGRNT is provided to the D input of D flip-flop 264 to cause the D flip-flop 264 to acknowledge the grant of bus mastership by the CPU 2 with the signals BGACK and BGACK- generated at the Q and $\overline{Q}$ outputs of the D flip-flop 264 when the signal PH0 provided to the clock input of the D flip-flop is activated. The signal BGACK- is provided to the CPU 2 to acknowledge the grant of bus mastership from the CPU 2 to the DMA sampler. The D flip-flop 264 is also provided with the signal ENBUSARB at its active-low clear terminal to clear the D flip-flop 264 before bus arbitration is enabled. The signal BGACK- is provided to the AND gate 154 of the sampler part 142 to enable an analog input signal to be sampled by the A/D converter 18 and output by the latch 22.

Also, the signal BGACK as provided to the D input of D flip-flop 265 having the signal PH1- as its clock input. The output Q of D flip-flop 265 is provided to NOR gate 266 at one input, while the signal ENRAMADR- is provided from the DMA circuit 26 to generate the control signal TOENCNTL.

Figure 8:
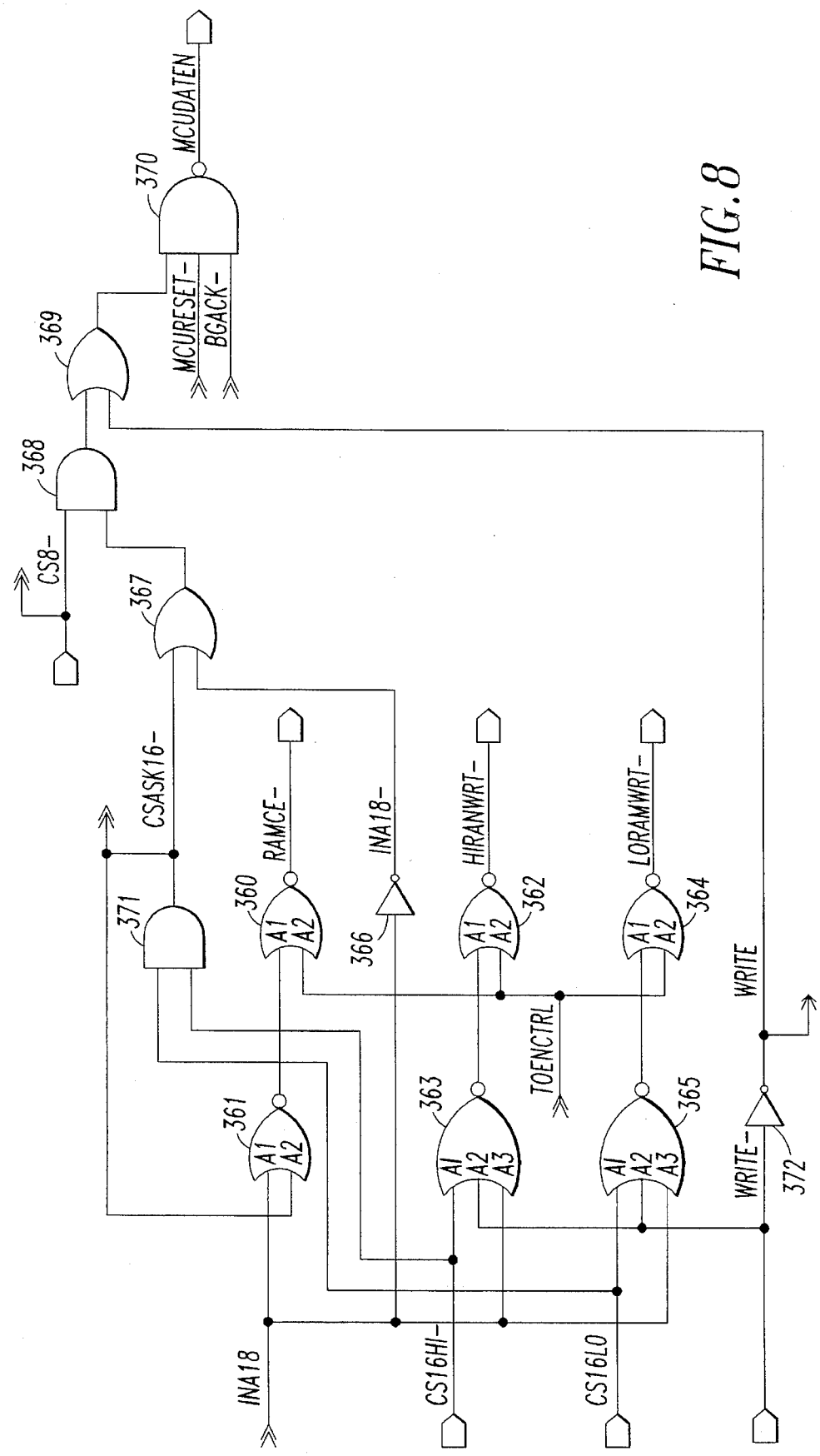
FIG. 8 is a subcircuit within the DMA circuitry of FIG. 1 which controls memory writes.

Referring to FIG. 8, logic circuit 36 includes NOR gates 360, 362, 364 which receive as one input the signal TOENCTRL from the DMA circuit 26. When the signal TOENCTRL is activated, the signal RAMCE- is generated by the NOR gate 360 to enable the CPU memory 4. The signal TOENCTRL is also used to activate the signals HIRAMWRT- and LORAMWRT- in the NOR gates 362 and 364, respectively. Activation of the signals HIRAMWRT- and LORAMWRT- allow a sample to be written into the CPU memory 4.

The CPU 2 may directly write data into the CPU memory 4 using either the signal INA18, the signal CS16HI and CS16L0 and, the signal WRITE- using NOR gates 361, 363 and 365. The outputs of the NOR gates 361, 363 and 365 are provided to inputs of the NOR gates 360, 362, 364 to generate the signals RAMCE-, HIRAMWRT- and LORAMWRT-. When the signal INA18- is used by the CPU to write data into the CPU memory 4, the signal INA18 is provided to inverter 366 having an output coupled to one input of the OR gate 367. The output of the OR gate 367 is provided to AND gate 368 having an output coupled to OR gate 369 to generate the signal MCUDATEN at the output of NAND gate 370. Through the generation of the signal MCUDATEN, the CPU 2 is able to provide data on the CPU bus 6. Similarly, when the CPU 2 is instructed to write data to the CPU memory 4 using the signals CS16HI and CS16LO, the NAND gate 371 generates the signal CSASIC16- to activate the signal RAMCE- through NOR gates 360 and 361, as well as to activate the signal MCUDATEN through OR gate 367, AND gate 368, OR gate 369 and NAND gate 370.

The CPU 2 may also generate the signal WRITE through inverter 372 to generate the signal MCUDATEN to provide data onto the CPU bus 6 through OR gate 369 and NAND gate 370. The NAND gate 370 is also provided with the signals MCURESET- and MACK- to insure that the signal MCUDATEN is generated only at the appropriate times.

Figure 9:
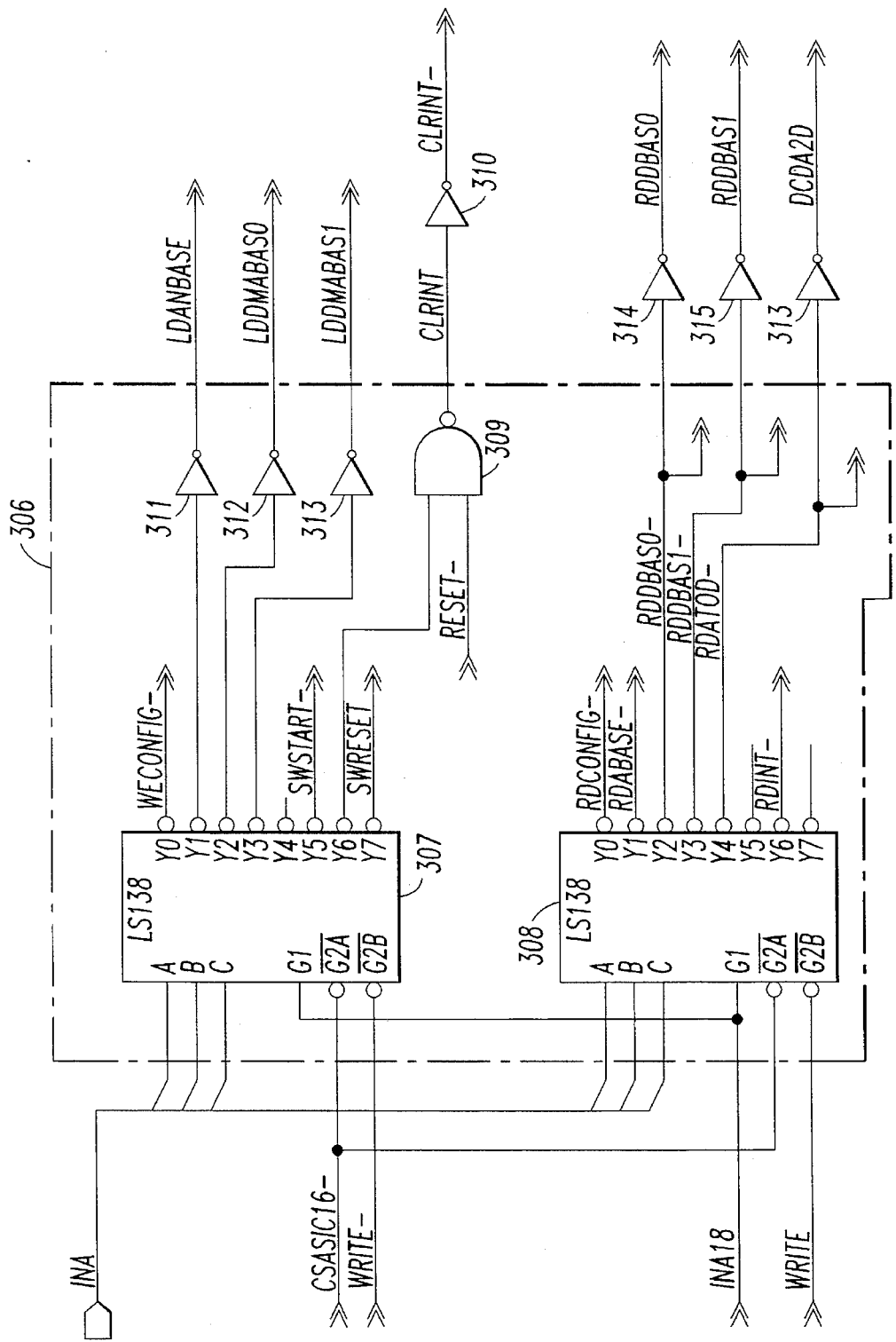
FIG. 9 is a circuit diagram of part of the decode logic circuit of FIG. 1.

Referring to FIG. 9, decode logic part 306 of the decode logic circuit 36 is provided with the signals CSASIC16-, WRITE-, WRITE and INA18 at inputs G1, G2$\overline{A}$ and G2$\overline{B}$, respectively, to enable TTL LS138 decoders 307 and 308.

The CPU 2 generates an appropriate address INA to generate various control signals using the decode logic part 306. To activate or deactivate certain bits of the control register 8, the CPU 2 generates an appropriate address INA to generate the signal WECONFIG-. To begin sampling, the CPU 2 generates an appropriate address INA to generate the signal SWSTART- which initiates sampling by the DMA sampler. Also, when the CPU 2 requires that the DMA sampler be reset to a state appropriate to begin sampling, the CPU 2 generates an appropriate address INA to generate the signal SWRESET-. Further, the CPU 2 may generate an appropriate address INA to generate a signal which is provided to an input of AND gate 309 which also receives the signal RESET- to generate the signal CLRINT. The signal CLRINT deactivates the signal DMAINT generated by the DMA interrupt circuit 32. An inverted version of the signal CLRINT is generated with inverter 310.

Prior to sampling, the CPU 2 loads base addressee BASE0, BASE1 and ANBASE into the memory address generator 28. The decode logic part 306 is used to generate the control signals necessary to perform this function. Specifically, the CPU 2 generates appropriate addresses INA to generate the signals LDANBASE, LDDMABAS0 or LDDMABAS1 through inverters 311, 312 and 313, respectively.

The LS131 decoder 308 of the decode logic part 306 may be addressed by the CPU 2 using an appropriate address INA to generate the signal RDCONFIG-. The signal RDCONFIG- is provided to the control register 8 so that the CPU 2 may read the contents of the control register 8.

The CPU 2 may generate an appropriate address INA to the inputs A, B and C of the LS138 decoder 308 to generate the signal RDATOD- which is provided to the sampler 14. The signal RDATOD- is provided to inverter 313 to generate the signal DCDA2D. Using the signals RDATOD- and DCDA2D generated in the LS138 decoder 308, the CPU 2 may obtain a sample without intervention by the DMA sampler.

Also, the CPU 2 generates an appropriate address INA to generate one of the control signals RDABASE-, RDDBAS0- and RDDBAS1- to cause the memory address generator 28 to provide the base addresses ANBASE, BASE0 and BASE1 to the CPU memory 4 via the CPU bus 6. The signals RDDBAS0- and RDDBAS1- are provided to the inputs of inverters 314 and 315 to generate the signals RDDBAS0 and RDDBAS1, respectively.

Also the CPU 2 may inhibit the memory address generator 28 from using the CPU bus 6 by activating the signal SWRESET-. The signal RDINT- is used to read the current status of the interrupt register to verify whether DMAINT, DGINT or XINT has occurred.

Figure 10A:
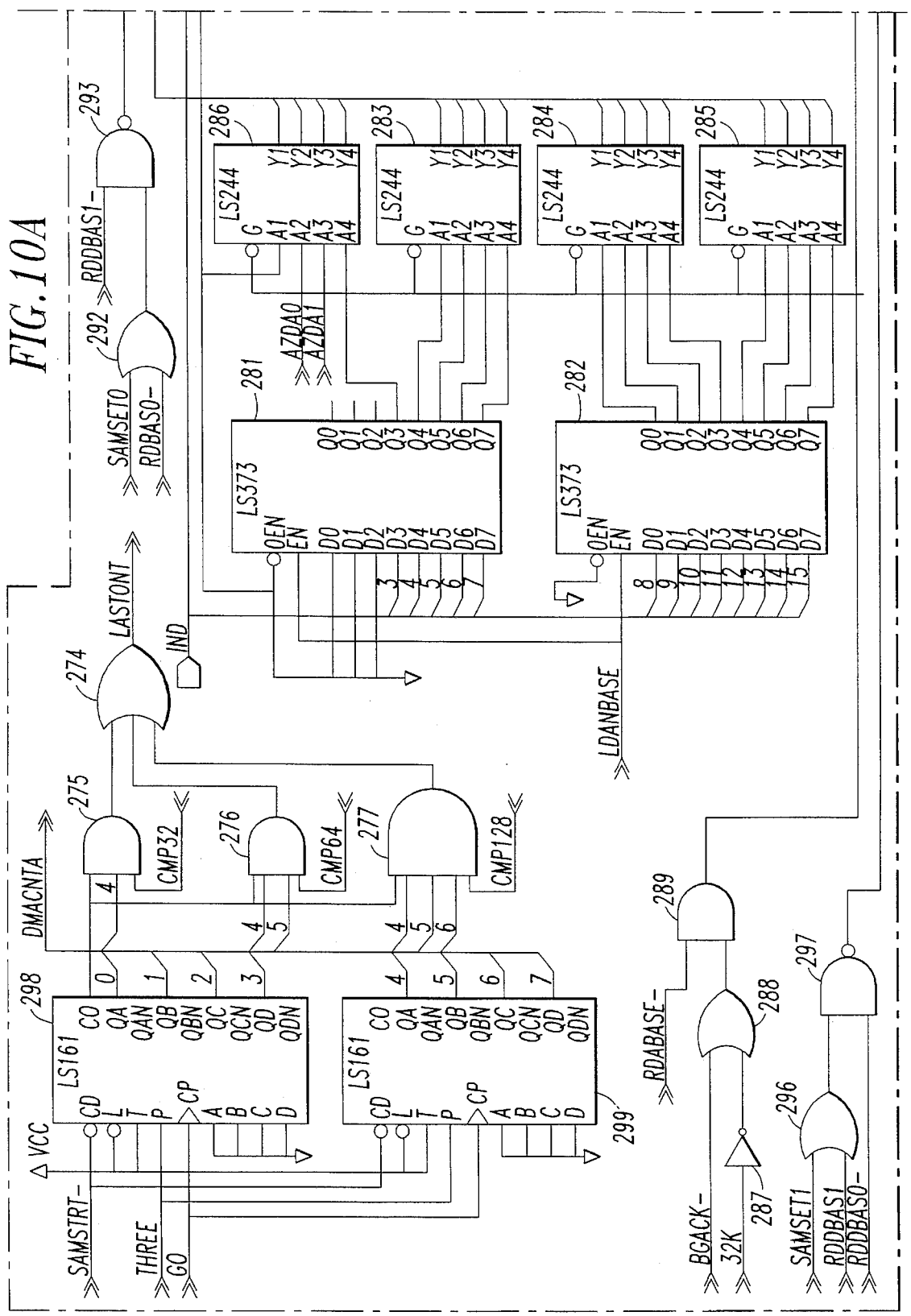
FIG. 10 is a circuit diagram of part of the memory address generator of FIG. 1.
Figure 10B:
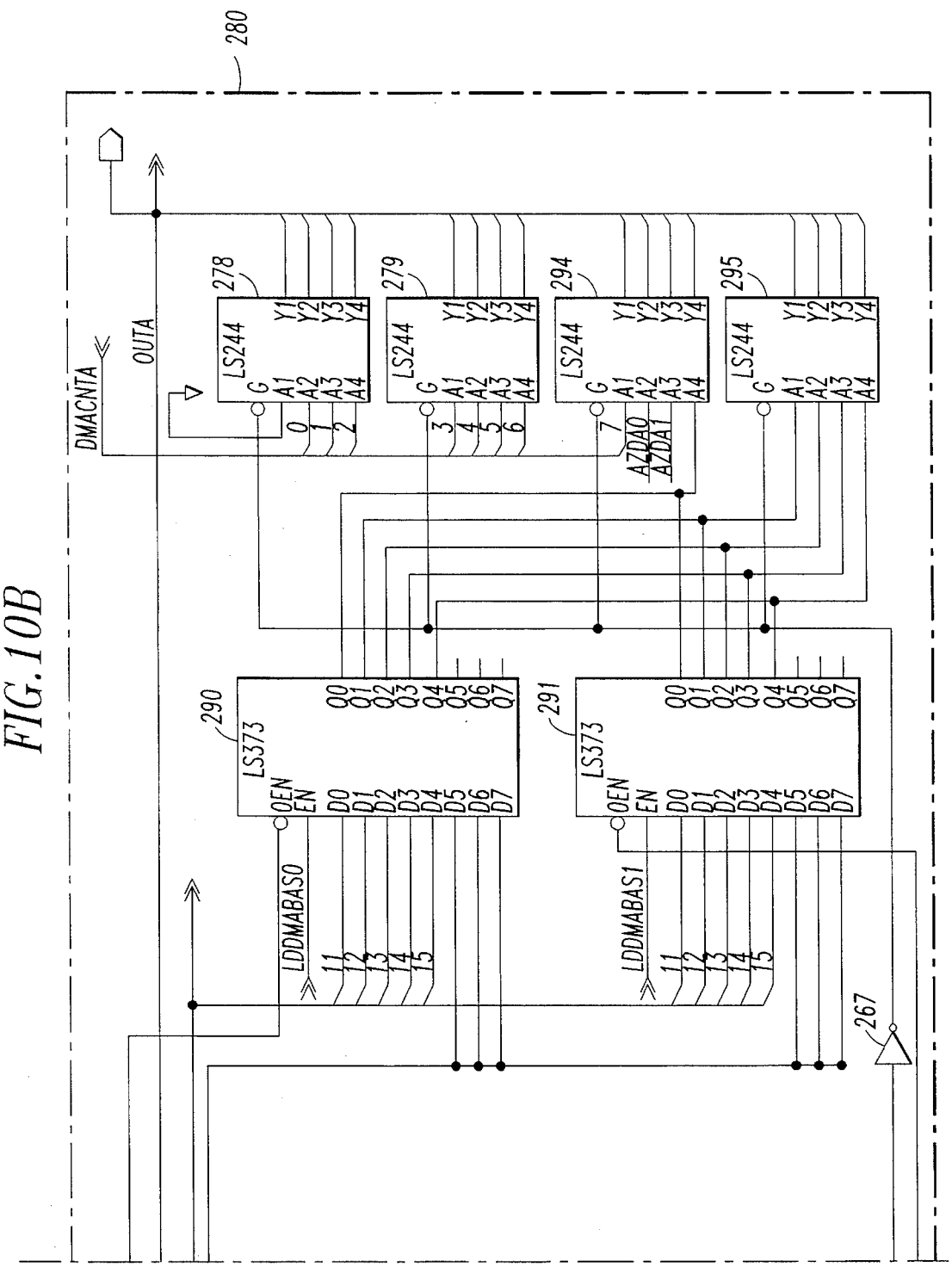

Referring to FIG. 10, the memory address generator 28 includes memory address generator part 280. TTL LS373 registers 281 and 282 are coupled to the CPU data bus to receive the signal IND. The LS373 registers 281 and 282 are enabled by the control signal LDANBASE generated by the CPU 2 through the decode logic part 306 to load the base address ANBASE into the LS373 registers 281 and 282. The signal IND is provided to input D3 through D7 of the LS373 register 281 and inputs D0 through D7 of the LS373 register 282. The inputs D0, D1 and D2 of the LS373 register 281 are tied to a low-voltage state since such inputs are not needed.

The outputs Q4 through Q7 of the LS373 register 281 and Q0 through Q3 and Q4 through Q7 of the LS373 register 282, are provided to inputs A1 through A4 of TTL LS244 latches 283, 284 and 285, respectively. The output Q3 of the LS373 register 281 is provided to the input A4 of LS244 latch 286. At the inputs A2 and A3 of the LS244 latch 286, the signals A2DA0 and A2DA1 from the A/D address generator 20 are used to generate appropriate address for the Nth cycle of sampling. The input A1 of the LS244 latch 286 is tied low since, as previously explained, samples for channels 4, 5, 6 and 7 of the A/D converter 18 are stored at CPU memory addresses ANBASE, ANBASE+2, ANBASE+4 and ANBASE+6.

The signal 32K is provided to inverter 287 having an output coupled to OR gate 288. The signal BGACK- is provided to the other input of OR gate 288 to generate appropriate timing for latching the CPU memory address in the LS244 latches 283, 284, 285 and 286. The output of the OR gate 288 is provided to one input of AND gate 289 while the control signal RDABASE- provided by the decode logic circuit 30 is provided to the other input of the AND gate 289. The output of the AND gate 289 is used to latch data into the LS244 latches 283, 284, 285 and 286. Thereby, the appropriate CPU memory address for the Nth cycle of sampling is provided as the signal OUTA on the address bus of the CPU bus 6. On the other hand, the output of AND gate 289 is provided as an input to inverter 267 having an output tied to the enable inputs of LS244 latches 278, 279, 294 and 295.

LS373 registers 290 and 291 receive the signal IND from the CPU bus 6 at respective inputs DO through D4. The CPU 2 generates the control signals LDDMABAS0 and LDDMABAS1 through the decode logic circuit 30 to write the base addresses BASE0 and BASE1 into the LS373 registers 290 and 291, respectively. The respective inputs D5 through D7 of the LS373 registers 290 and 291 are tied to a low-voltage state.

The signal SAMSET0 and RDBAS0 are provided to the inputs of OR gate 292 having an output coupled to one input of AND gate 293. The other input of the NAND gate 293 receives the signal RDDBAS1- from the CPU 2 via the decode logic circuit 30. The output of the NAND gate 293 is provided to the output enable input of the LS373 register 290 to allow the base address BASE0 to be latched into input A4 of LS244 latch 294 and inputs A1 through A4 of LS244 latch 295. Similarly, the signals SAMSET1 and RDDBAS1 are provided to the inputs of OR gate 296 to generate an output coupled to one input of NAND gate 297. The other input to the NAND gate 297 is the signal RDDBAS0-, and the output of the NAND gate 297 is provided to the output enable input of the LS373 register 291. When activated, the output of the NAND gate 297 causes base address BASE1 to be provided through outputs Q0 through Q4 to the input A4 of the LS244 latch 294 and the inputs A1 through A4 of the LS244 latch 295. The outputs Y4 of the LS244 latch 294 and Y1 through Y4 of the LS244 latch 295 are therefore enabled at appropriate times to provide the base address BASE0 and BASE1 onto the CPU bus 6 to address the CPU memory 4.

The inputs A2 and A3 of the LS244 latch 294 receive the signals A2DA0 and A2DA1, respectively, from the A/D address generator 20 to provide the next most significant bits for addressing the CPU memory 4.

The least significant bits for generating the CPU memory addresses for sample sets 0 and 1 are generated in LS161 counters 298 and 299. The LS161 counters 298 and 299 receive the signal SAMSTRT- at respective clear data inputs so that count values of the LS161 counters 298 and 299 are cleared upon the beginning of a look. At the pulse inputs of the LS161 counters 298 and 299, the signal THREE is provided to increment the counter after four samples from the A/D converter 18 have been taken. The signal THREE comes from the counting sequence: zero, one, two, THREE; each of which corresponds to A/D address inputs 0, 1, 2, 3, respectively.

The clock inputs of the LS161 counters 298 and 299 receive the signal GO so that the LS161 counters 298 and 299 effectively maintain a record of the number of cycles completed during a look. The outputs QA through QD of the LS161 counters 298 and 299 are provided as the signal DMACNTA to the inputs A2 through A4 of LS244 latch 278 and the inputs A1 through A4 of LS244 latch 279. The input A1 of the LS244 latch 278 is tied to a low-voltage state since this bit is not needed to generate CPU memory addresses for sample sets 0 and 1.

The carry out output of the LS161 counter 298 is provided to one input of AND gates 275, 276 and 277. The other input of the AND gate 275 receives the output QA of the LS161 counter 299, the AND gate 276 receives the outputs QA and QB of the LS161 counter 299, and the AND gate 277 receives the outputs QA, QB, QC of the LS161 counter 299. The AND gates 275, 276 and 277 also receive the signals CMP32, CMP64 and CMP128, respectively. Since the last count of the LS161 counters 298 and 299 depends upon the number of bits in each sample, the signals CMP32, CMP64 and CPU128 are provided to the AND gates 275, 276 and 277, respectively, to generate the signal preLASTCNT through OR gate 274. The signal preLASTCNT is provided to the sampler 14 to indicate the occurrence of the Nth cycle of sampling for a given look.

Figure 11:
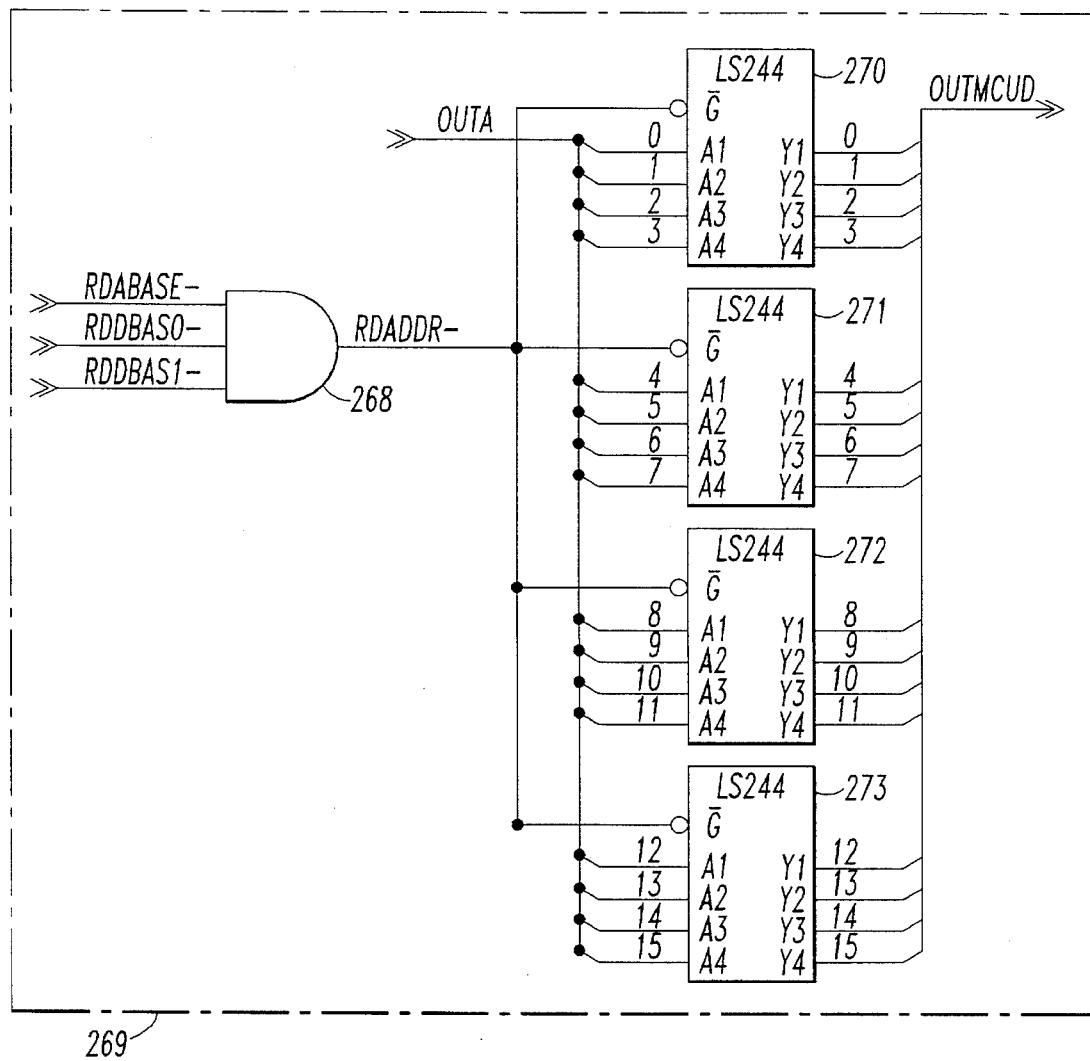
FIG. 11 is a circuit diagram of part of the memory address generator of FIG. 1.

Referring to FIG. 11, the signal OUTA generated by the appropriate LS244 latches 283, 284, 285, 286, 278, 279, 294 and 295 is provided to the inputs A1 through A4 of LS244 latches of memory address generator part 269. The control signals RDABASE-, RDDBAS0, and RDDBAS1- are provided to the inputs of AND gate 268 to generate the signal RDADDR- to enable the latch to output a CPU memory address from the LS244 latches 270, 271, 272 and 273 on respective outputs Y1 through Y4. The CPU memory address is output as the signal OUTMCUD.

Figure 12:
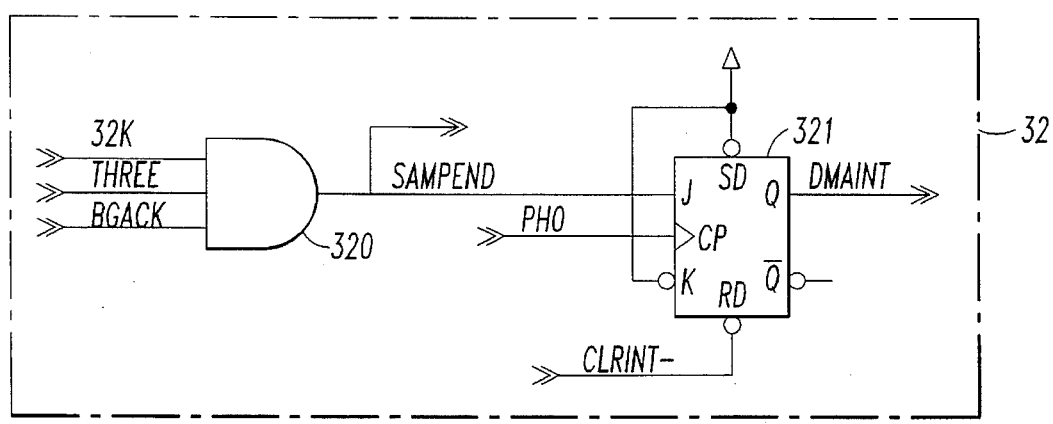
FIG. 12 is a circuit diagram of the DMA interrupt circuit of FIG. 1.

Referring to FIG. 12, the DMA interrupt circuit 32 receives the signals 32K and THREE at inputs to AND gate 320. The AND gate 320 also receives the signal BGACK from the DMA circuit 26. The output of the AND gate 320 is the signal SAMPEND which is provided to the sampler 14 to indicate the end of a look. The signal SAMPEND is also provided to the J input of J-K flip-flop 321 which receives the signal PH0 at its clock input. When the signal SAMPEND is activated, the signal DMAINT at the Q output of the J-K flip-flop 321 is activated to advise the CPU 2 that sampling for one look has been completed by the DMA sampler. The signal DMAINT is provided to the interrupt status register 34 so that the CPU 2 will be advised of the completion of one look of sampling. The CPU 2 generates the signal CLRINT- provided to the reset input of the J-K flip-flop 321 to deactivate the signal DMAINT.

Figure 13:
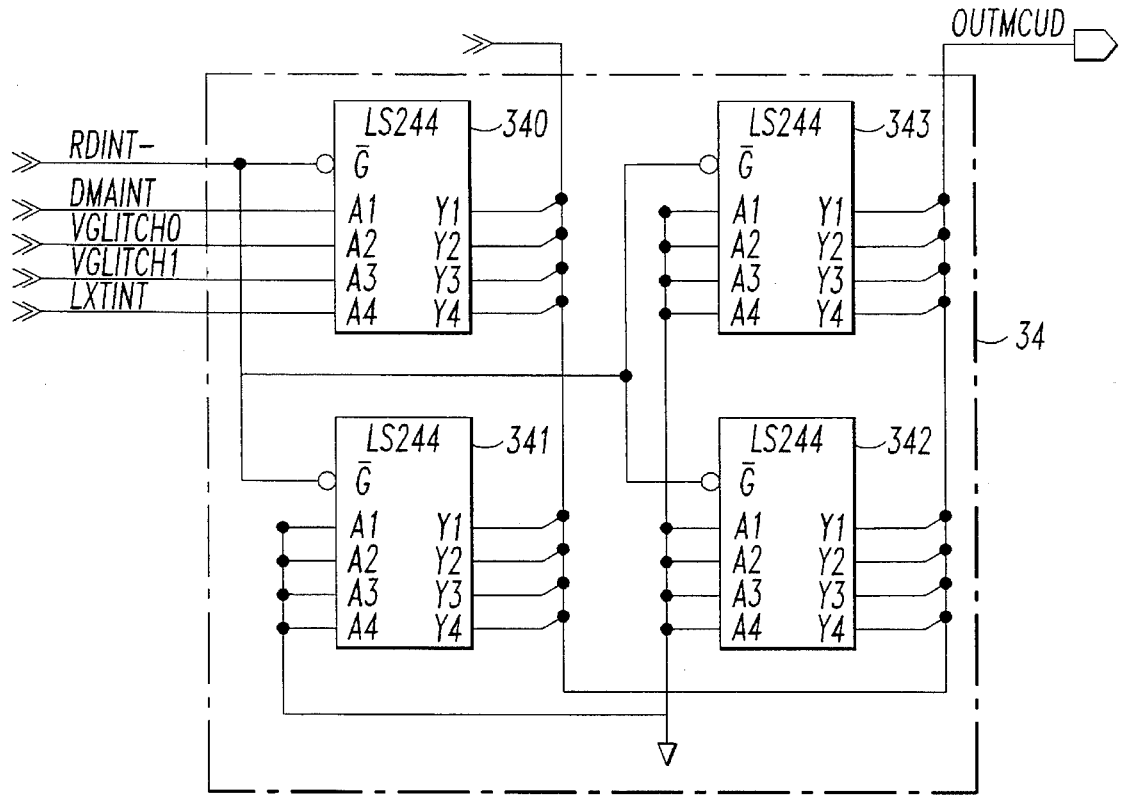
FIG. 13 is a circuit diagram of the interrupt status register of FIG. 1.

Referring to FIG. 13, signal RDINT- is generated by the CPU 2 and provided to the interrupt status register 34 when the CPU 2 requires the status of various interrupts generated by the DMA sampler. Specifically, the signal DMAINT, VGLITCH0, VGLITCH1 and LXTINT are provided to the inputs A1, A2, A3 and A4, respectively, of LS244 latch 340. The inputs A1 through A4 of LS244 latches 341, 342 and 343 are tied to a low-voltage state. Upon activation of the signal RDINT-, the signals DMAINT, VGLITCH0, VGLITCH1 and LXTINT are provided as the signal OUTMCUD to the CPU 2 via the CPU bus 6.

Figure 14:
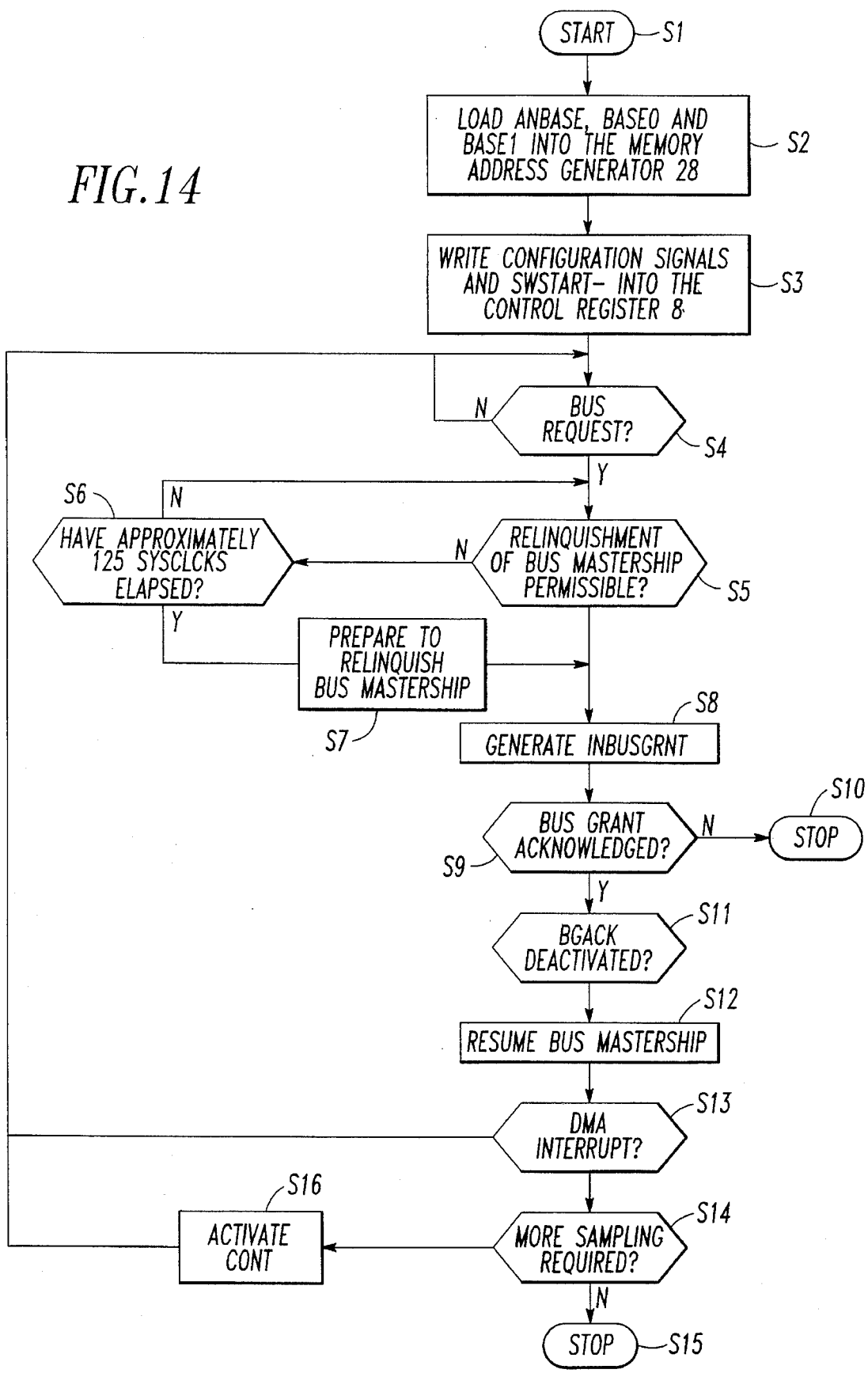
FIG. 14 is a flow chart representation of typical processing by the CPU of FIG. 1.

Referring to FIG. 14, a flow chart representation of typical processing performed by the CPU 2 operating in conjunction with the DMA sampler starts at step S1 upon receiving an instruction directing the CPU 2 to begin sampling.

The CPU 2 prepares for sampling at step S2 by loading the base addresses ANBASE, BASE0 and BASE1 into the memory address generator 28. At step S3, the CPU 2 writes to the control register 8 to configure the DMA sampler (i.e., designate the number of cycles per look, etc.) and to activate the signal SWSTART- to initiate sampling by the DMA sampler.

Thereafter, the CPU 2 performs other processing and periodically checks to determine whether a bus request has been made by the DMA sampler at step S4. If not, the CPU 2 continues with other processing. On the other hand, when a bus request is made by the DMA sampler, the CPU 2 determines whether relinquishment of bus mastership is permissible at step S5. If not, the CPU 2 continues with other processing until relinquishment of bus mastership is permissible. In any case, the CPU 2 will relinquish bus mastership at step S6 approximately 125 SYSCLKs after a bus request has been received by the CPU 2. In this case, the CPU 2 is instructed to prepare to relinquish bus mastership at step S7.

When the CPU 2 determines either that it is permissible to relinquish bus mastership at step S5 or that approximately 125 SYSCLKs have elapsed at step S6, the CPU 2 generates the signal INBUSGRNT at step S8 to indicate a grant of bus mastership to the DMA sampler. At step S9, the CPU 2 determines whether the grant of bus mastership has been acknowledged by the DMA sampler, and if not, the CPU 2 terminates processing at step S10 since an error has occurred in the system in this eventuality. On the other hand, when the DMA sampler acknowledges the grant of bus mastership, the CPU 2 determines whether the signal BGACK has been deactivated by the DMA sampler at step S11, and resumes bus mastership at step S12.

At step S13, the CPU 2 determines whether a DMA interrupt has occurred. If not, steps S4–S12 are repeated. On the other hand, when a DMA interrupt is received by the CPU 2 at step S13, the CPU 2 determines whether more sampling is required at step S14. If not, the CPU terminates processing at step S15. On the other hand, if further processing is required at step S14, the CPU 2 activates the signal CONT at step S16 and repeats the steps S4–S15.

The many features and advantages of the present invention are apparent from the detailed specification and thus, it is intended by the appended claims to cover all such features and advantages of the devices and methods which follow in the true spirit and scope of the invention. Further, since numerous modifications and changes will readily occur to those skilled in the art, it is not desired to limit the invention to the exact construction and operation illustrated and described. Accordingly, all suitable modifications and their equivalents may be resorted to as falling within the scope and spirit of the invention.

We claim:

1. A sampling apparatus comprising:
    an analog to digital converter for receiving analog data from N inputs and converting said analog data to digital data, where N is a finite even integer greater than zero; and
    means for sampling operably connected to said analog to digital converter for controlling said analog to digital converter;
    whereby said means for sampling repeatedly cycles among a first N/2 inputs for M−1 clock cycles at a first predetermined substantially fixed sampling rate, and upon the Mth clock cycle samples all N inputs at a second predetermined substantially fixed sampling rate in a predetermined pattern in order to maintain said first predetermined substantially fixed sampling rate of said first N/2 analog inputs, where M is a finite integer greater than one.

2. The sampling apparatus of claim 1 further comprising:
a memory operably connected to said analog to digital converter for storing said digital data.

3. The sampling apparatus of claim 2 further comprising:
direct memory access means operably connected to said analog to digital converter for transmitting said digital data to said memory.

4. The sampling apparatus of claim 3 further comprising:
a central processing unit (CPU) for controlling operations of said sampling apparatus, said CPU operably connected to said memory and said direct memory access means.

5. The sampling apparatus of claim 4 further comprising:
bus means operably connecting said CPU, said direct memory access means, said memory, and said means for sampling.

6. The sampling apparatus of claim 4 further comprising:
bus means operably connecting said CPU, said direct memory access means, said memory, and said means for sampling;
whereby said direct memory access means obtains bus mastership from the CPU for a predetermined interval of time in order to effect a data transfer to said memory.

7. The sampling apparatus of claim 4 further comprising:
bus means operably connecting said CPU, said direct memory access means, said memory, and said means for sampling;
whereby said predetermined pattern for sampling is accomplished by interleaving said analog data from said N inputs.

8. The sampling apparatus of claim 4 further comprising:
bus means operably connecting said CPU, said direct memory access means, said memory, and said means for sampling;
whereby said predetermined pattern for sampling is accomplished by interleaving said analog data from said N inputs, and N equals 8 and M is selected from the number set 32, 64, 128, and 256.

9. The sampling apparatus of claim 4 further comprising:
bus means operably connecting said CPU, said direct memory access means, said memory, and said means for sampling;
whereby said predetermined pattern for sampling is accomplished by interleaving said analog data from said N inputs, and said second predetermined substantially fixed sample rate is twice that of said first predetermined substantially fixed sampling rate.

10. The sampling apparatus of claim 2 further comprising:
means for converting said digital data into signed two's complement representation; and
direct memory access means operably connected to said analog to digital converter for transmitting said signed two's complement representation to said memory.

11. A method for sampling, in a system including an analog to digital converter for receiving analog data from N inputs and converting said analog data to digital data, and means for sampling operably connected to said analog to digital converter; the method comprising the steps of:
(a) sampling said first N/2 inputs at a first predetermined substantially fixed sampling rate;
(b) repeating step (a) for M−1 clock cycles, whereby M is integer greater than one and N is even positive integer;
(c) sampling all N inputs at a second predetermined substantially fixed rate upon the Mth clock cycle in a predetermined pattern in order to maintain said first predetermined substantially fixed sampling rate of said first N/2 analog inputs.

12. The method for sampling of claim 11 further including the steps of:
repeatedly sampling all N inputs at a second predetermined substantially fixed rate upon the Mth clock cycle in a predetermined pattern in order to maintain said first predetermined substantially fixed sampling rate of said first N/2 analog inputs;
whereby said predetermined pattern for sampling is accomplished by interleaving said analog data from said N inputs.

13. The method for sampling of claim 12 including the steps of:
converting analog input data to digital data; and
storing the digital data in a memory.

14. The method for sampling of claim 13 where the storing step further includes the steps of:
receiving notification by said direct memory access means from said sampling circuit upon reception of a sample:
requesting bus mastership by the direct memory access means from the CPU;
waiting for bus mastership transfer of a bus from CPU control to said direct memory access means;
transmitting a sample from the direct memory access means to a bus; and
storing said sample in memory.

15. The method for sampling of claim 12 including the steps of:
converting analog input data to digital data;
converting said digital data into a two's complement representation; and
storing the two's complement representation in a memory.

16. The method for sampling of claim 11 including the steps of:
converting analog input data to digital data; and
storing the digital data in a memory.

17. The method for sampling of claim 16 where the storing step further includes the steps of:
receiving notification by said direct memory access means from said means for sampling upon reception of a sample;
requesting bus mastership by the direct memory access means from the CPU;
waiting for bus mastership transfer of a bus from CPU control to said direct memory access means;
transmitting a sample from the direct memory access means to a bus; and
storing said sample in memory.

18. The method for sampling of claim 11 further including the steps of:
repeatedly sampling all N inputs at a second predetermined substantially fixed rate upon the Mth clock cycle in a predetermined pattern in order to maintain said first predetermined substantially fixed sampling rate of said first N/2 analog inputs;
whereby said predetermined pattern for sampling is accomplished by interleaving said analog data from said N inputs, N equals 8 and M is selected from the number set 32, 64, 128, and 256.

19. The method for sampling of claim 11 further including the steps of:

repeatedly sampling all N inputs at a second predetermined substantially fixed rate upon the Mth clock cycle in a predetermined pattern in order to maintain said first predetermined substantially fixed sampling rate of said first N/2 analog inputs;

whereby said predetermined pattern for sampling is accomplished by interleaving said analog data from said N inputs, and said second predetermined substantially fixed sample rate is twice that of said first predetermined substantially fixed sampling rate.

* * * * *